(12) United States Patent
Besnier et al.

(10) Patent No.: US 11,941,473 B2
(45) Date of Patent: Mar. 26, 2024

(54) DEVICE IN PARTICULAR PRINTED ITEM FOR DATA COMMUNICATION

(71) Applicant: INTERACTIVE PAPER GMBH, Vienna (AT)

(72) Inventors: Raphael Besnier, Vienna (AT); Tobias Macke, Perchtoldsdorf (AT)

(73) Assignee: Interactive Paper GmbH, Vienna (AT)

( * ) Notice: Subject to any disclaimer, the term of this patent is extended or adjusted under 35 U.S.C. 154(b) by 949 days.

(21) Appl. No.: 16/620,688

(22) PCT Filed: Jun. 8, 2018

(86) PCT No.: PCT/AT2018/060119
§ 371 (c)(1),
(2) Date: Dec. 9, 2019

(87) PCT Pub. No.: WO2018/223171
PCT Pub. Date: Dec. 13, 2018

(65) Prior Publication Data
US 2020/0125917 A1 Apr. 23, 2020

(30) Foreign Application Priority Data

Jun. 9, 2017 (AT) .................................. 60049/2017
Sep. 3, 2017 (AT) .................................. 60084/2017
(Continued)

(51) Int. Cl.
*G06K 19/077* (2006.01)
*G06K 19/02* (2006.01)
(Continued)

(52) U.S. Cl.
CPC ..... *G06K 19/07775* (2013.01); *G06K 19/025* (2013.01); *G06K 19/072* (2013.01);
(Continued)

(58) Field of Classification Search
CPC .......... G06K 19/07775; G06K 19/025; G06K 19/072; G06K 19/07722; G06K 19/07779;
(Continued)

(56) References Cited

U.S. PATENT DOCUMENTS

| 2008/0061148 A1 | 3/2008 | Tanner |
| 2008/0094181 A1 | 4/2008 | Lenevez et al. |
| 2016/0180210 A1 | 6/2016 | Spears |

FOREIGN PATENT DOCUMENTS

| CN | 105893893 A | 8/2016 |
| DE | 102013223505 B3 | 11/2014 |

(Continued)

*Primary Examiner* — Thien M Le
*Assistant Examiner* — Tae W Kim
(74) *Attorney, Agent, or Firm* — Laurence A. Greenberg; Werner H. Stemer; Ralph E. Locher

(57) ABSTRACT

A device has a substrate, a plurality of switches located on the substrate, a plurality of NFC chips, each associated with a switch, and an NFC antenna. The switches and the NFC chips associated therewith are interconnected in series and are connected to the NFC antenna. The device contains a label which is joined face to face with the substrate, the individual NFC chips are arranged on the label. The switches are arranged on the substrate but not on the label, and mutually opposed contact points contacting the conductor tracks with each other are provided on the substrate and on the label to electrically connect the switches, the NFC chips and the NFC antenna.

13 Claims, 15 Drawing Sheets

(30) Foreign Application Priority Data

Nov. 19, 2017 (AT) .................................. 60129/2017
Jan. 19, 2018 (AT) .................................. 50042/2018

(51) Int. Cl.
*G06K 19/07* (2006.01)
*H01Q 1/22* (2006.01)
*H01Q 1/38* (2006.01)

(52) U.S. Cl.
CPC . *G06K 19/07722* (2013.01); *G06K 19/07779* (2013.01); *H01Q 1/2208* (2013.01); *H01Q 1/38* (2013.01)

(58) Field of Classification Search
CPC ....... G06K 19/07754; G06K 19/07709; H01Q 1/2208; H01Q 1/38
USPC ........................................................ 235/492
See application file for complete search history.

(56) References Cited

FOREIGN PATENT DOCUMENTS

| KR | 101688140 B1 | * | 12/2016 |
|---|---|---|---|
| WO | 2016085270 A1 | | 6/2016 |

* cited by examiner

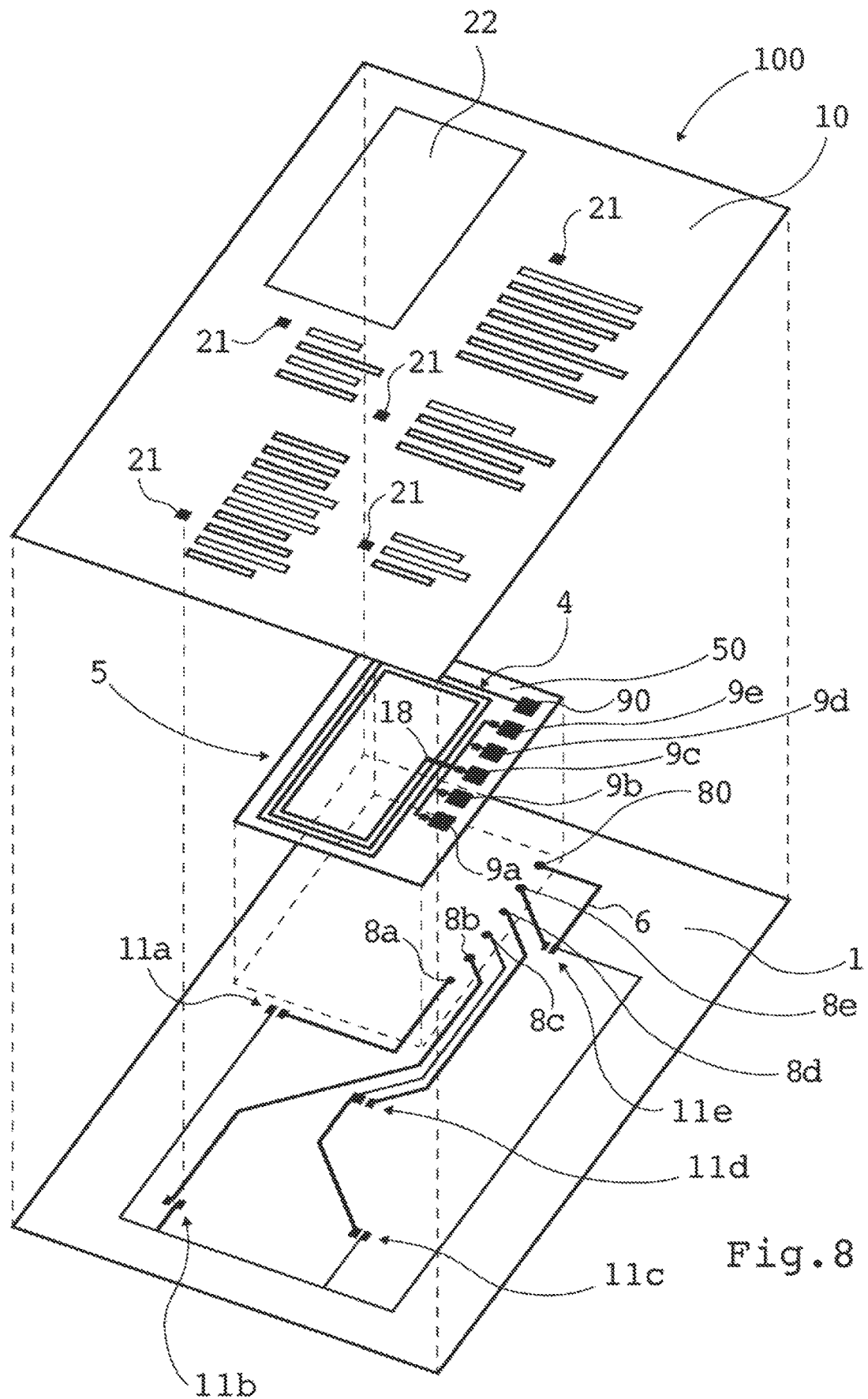

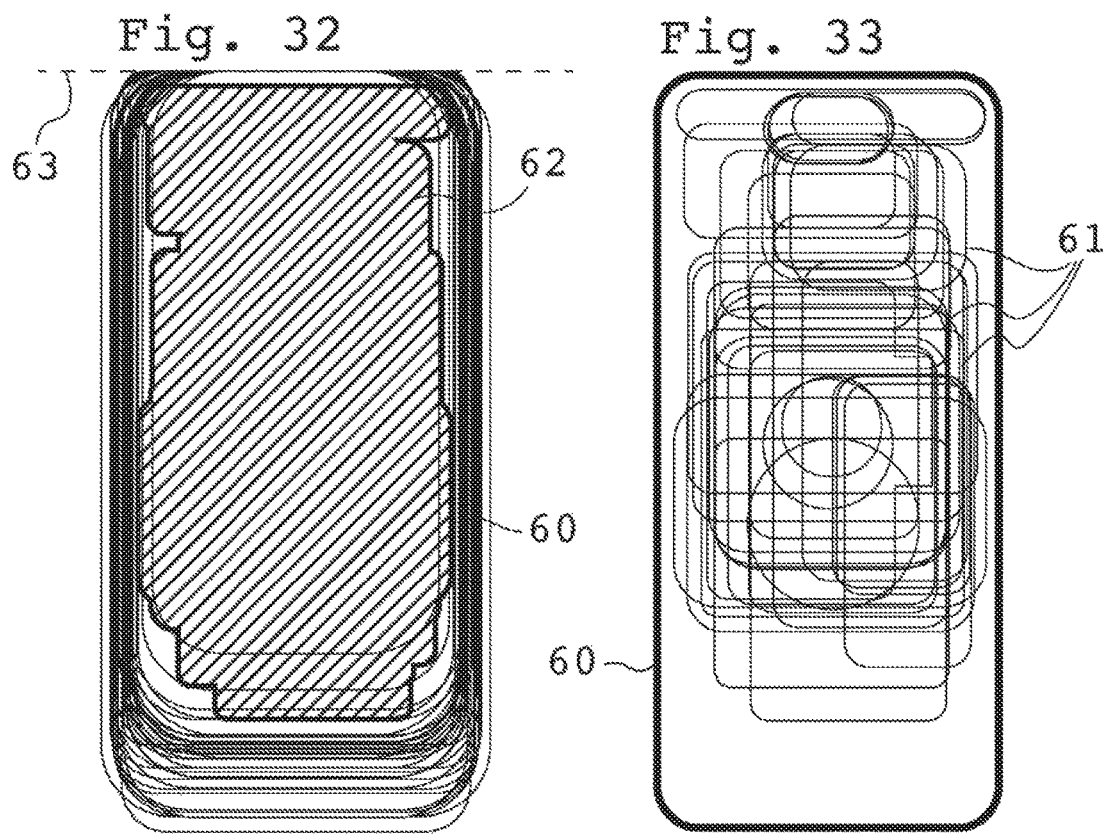
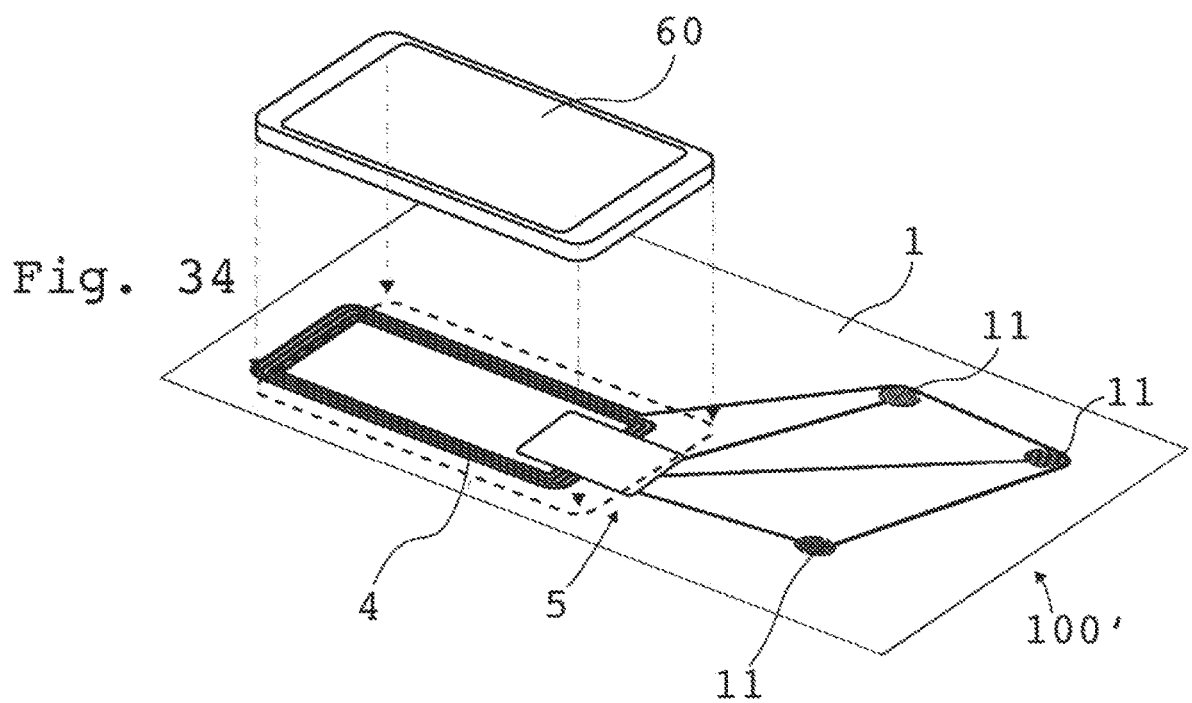

DEVICE IN PARTICULAR PRINTED ITEM FOR DATA COMMUNICATION

BACKGROUND OF THE INVENTION

Field of the Invention

The invention relates to a device, in particular a printed item, as claimed in the independent device claim, an arrangement as claimed in the independent arrangement claim, a label as claimed in the independent label claims, a switch as claimed in the independent switch claim, a production method as claimed in the independent method claim and also a switching arrangement as claimed in the independent switching arrangement claim.

In the following statements, unless otherwise indicated, "conducting" or "conductive" is always understood as meaning "electrically conducting" or "electrically conductive". Similarly, unless otherwise indicated, "insulating" is always understood as meaning "electrically insulating".

The invention relates in particular to a device, comprising a substrate, a number of switches, interrupted in the initial state, on the substrate, a number of NFC chips, assigned to a switch, and an NFC antenna,
  the switches and the NFC chips assigned to them being connected to one another in series and being connected to the NFC antenna.
  According to the invention, it is provided in particular
  that the device comprises a label, which is joined face to face with the substrate,
  that the individual NFC chips are arranged on the label,
  that the switches are arranged on the substrate not on the label,
  that, for the electrical connection of the switches, the NFC chips and the NFC antenna on the substrate, conductor tracks are provided, and
  that mutually facing contact points, which contact the conductor tracks to one another, are provided on the label and on the substrate.

The prior art discloses a large number of devices that enable a user by means of NFC technology to select and call up a specific item of information or to establish an item of information to be actively displayed or transmitted and to transmit it to the respective NFC device. For example, the publication US 2008061148 A1 discloses an electronic payment card with an inbuilt switch that allows a choice to be made between two different account numbers by means of RFID technology.

The publication US 2008094181 A1 discloses a remote control unit based on RFID technology with a large number of RFID modules and switches, wherein a user can, by activating one of the switches, in each case carry out the commands associated with an RFID module. The publication discloses a large number of modules each with an antenna, which in various ways and independently of one another record, pass on and further transmit items of information, but altogether only a single command can be carried out in each case with each RFID module.

In principle, there is specifically in the area of printed media a considerable demand for solutions in which print and digital contents can be meaningfully linked to one another. At the same time, there is little interest among users in obtaining additional items of information by way of QR codes or NFC tags of a conventional type.

Particularly in the area of print media, technologies that enable a reader to interact intuitively with print media are of interest. NFC tags, which are for example integrated in a material such as paper, are known in this respect. These enable a user to call up a single link, stored on the NFC tag, with an NFC-enabled data transmission device.

This procedure presents a technical disadvantage, especially in terms of production and cost. The number of links that can be integrated in a print application by means of conventional NFC tags is very limited. Each further link requires a further dispensing unit of a further NFC tag in production and consequently causes considerable costs. Moreover, on account of the constant activation of the tags, links can be called up inadvertently when an NFC-enabled data communication device is in the vicinity of an NFC tag, and similarly the calling up of a link can be disturbed by other NFC tags, which leads to inconveniences in use.

Moreover, there is the disadvantage that the user is directed away from the printed content and toward his cell phone. The problem for print media is that there is no return link that directs the reader back again to the printed content. Consequently, in return for the supplementary digital content, the publisher runs a high risk of readers abandoning the print medium.

The disadvantages of QR codes are especially the not very appealing visuals and the low user friendliness, since in the case of most smartphones the use of QR codes still requires the use of an additional app; this represents a great barrier. Similarly, the overall procedure of reading in the QR code, that is to say opening the app and scanning, etc., also requires a certain time, which makes the use of QR codes not much easier or user-friendly than for example an Internet search.

SUMMARY OF THE INVENTION

In this connection, the object of the invention is to offer the customer a possibility of interactive engagement that is enabled by physically touching the paper and offers an easy and quick way of calling up multiple items of optional information or links. For the manufacturer, it is in this case of advantage if it can be flexible in establishing the position of the switches, if need be in specific cases also the design of the NFC antenna. It is similarly of advantage if the printed matter can be produced inexpensively by means of printing processes that are generally available or can be achieved with only minor modifications. It is also of advantage if the paper used for the print is very thin or that the user or reader scarcely notices anything of the electronic components used. In addition, the need for energy stores to be integrated in the paper should be avoided.

The object of the invention is also to provide a device with which the user can interactively select a plurality of items of information to be transmitted by way of NFC technology, without a separate NFC tag having to be provided for each item of information to be displayed. The object of the invention is similarly to produce such a device by methods that require only slight modifications in comparison with standard printing processes.

The invention achieves this object by a device of the type mentioned at the beginning comprising
  a, preferably flexible, substrate, in particular consisting of paper or cardboard,
  a number of switches, arranged on the substrate and interrupted in their initial state,
  a number of NFC chips, respectively assigned to at least one switch,
  an NFC antenna,
  the switches and the NFC chips assigned to them being connected to one another in series and the individual series circuits thus created, respectively comprising one of the switches and the NFC chip assigned to it, being connected in each case to the NFC antenna.

According to the invention, it is in this case provided that the device comprises a label with a film-like main body, the label being joined face to face with the substrate, that the individual NFC chips are arranged on the label, that the switches are arranged on the substrate in a region different from the label, that, for the electrical connection of the switches, NFC chips and NFC antenna on the substrate, possibly also on the label, conductor tracks are provided, and that mutually facing contact points, which establish an electrically conducting contact between the conductor tracks on the label and on the substrate, are provided on the label and on the substrate.

That for example thin paper can also be used as the substrate and a user touching the substrate cannot feel the conductor tracks that are on the substrate can be ensured by the conductor tracks on the label and/or on the substrate being electrically conductive layers, in particular created by an electrically conductive lacquer or by an electrically conductive ink or film, or consisting thereof.

In order in the course of the printing process to bring about simple contacting of the label on the substrate, it may be provided that the mutually facing contact points, in particular of the substrate, are electrically conductive layers, in particular created by a conductive lacquer, a conductive film or an electrically conductive ink or consist thereof, the conductive lacquer and/or the contact points being formed as superficially conducting, preferably non-oxidizing.

A variant of a device, for example a printed item, according to the invention that is easy to create provides that the NFC antenna is arranged together with the NFC chips on the label.

In order to conceal the required electronic components effectively and in order to allow a simple formation of advantageous switches, a further substrate may be provided, in particular consisting of paper or cardboard, preferably consisting of the same material as the substrate, the label being arranged between the two substrates.

In order to provide for a user a switch that can be integrated imperceptibly to touch between two substrates and offers a positive user experience and can also be operated easily, it may be provided that at least one of the switches is formed by two switch elements lying opposite one another on the substrate and the further substrate and arranged facing one another, at least one of the switch elements having, facing the other switch element respectively, an insulating surface layer, in particular an oxide layer, which is preferably arranged between the two switch elements and electrically insulates them from one another in the initial state, in particular that the switch elements are arranged in such a way that the at least one insulating surface layer of one of the switch elements when exposed to a force normal to the plane of extent of the substrate breaks or tears or is elastically deformed and a contact is produced between the two switch elements and the switch is consequently in the activated state.

In addition, such a switch also proves to be easy and inexpensive to produce. Furthermore, it is achieved by this measure that the device according to the invention can be formed as very thin.

A switch that can be produced particularly easily and with which easier conductor track routing is achieved, provides that the switch elements running on the substrate have two connections interrupted by an interruption, which are electrically insulated from one another in the initial state, and arranged on the region of the further substrate that is opposite the switch elements is a further switch element, which is designed to come into electrically conducting contact with each of the connections of the switch element when exposed to force in such a way as to bridge the interruption and connect the connections of the switch elements interrupted by the interruption in an electrically conducting manner.

In order to achieve the effect that a switch is not constantly conducting unintentionally or because of a production fault, or in order to avoid the situation where, due to it being integrated in printed items such as journals, a switch is activated during the stacking of a large number of substrates one on top of the other that is performed in the further processing of the device it may be provided that at least one of the switch elements, possibly both switch elements, is formed by a layer of conducting material with a superficially insulating coating, in particular of superficially oxidized aluminum or with a superficially conductive material, in particular conductive silver lacquer, which is preferably coated with a partially applied, curing, and preferably electrically insulating, material such as relief lacquer or UV-curing adhesive, and wherein possibly the opposite switch element is formed with superficially electrically conductive material, in particular conductive silver lacquer.

It may preferably be provided for this purpose that the substrate and the further substrate are adhesively bonded to one another, and that region of the substrate and/or of the further substrate in the region of or within a surrounding area of the switch elements is kept free of adhesive.

A device which can be created by a simple further production variant and with which the type and the positions of the individual switches can be flexibly established provides that the switches are respectively arranged separately on further labels, these further labels being arranged on the substrate, possibly between the substrates or on one of the substrates.

A device which can be produced particularly easily by means of mass production and with which the costs of mass production can be lowered, wherein individual components can be produced in advance, provides that the NFC antenna and the NFC chips are arranged on the label, that the NFC antenna is formed on the label, in particular printed on, etched or punched out, and has a plurality of windings and also an inner connection and an outer connection, and that a bridging is provided, which is connected in an electrically conducting manner to the inner connection, the bridging being led in an insulated manner from the windings into the region outside the NFC antenna, that in each case one of the connections of each of the NFC chips located on the label is connected in an electrically conducting manner respectively to a contact point, that the other connection respectively of each of the NFC chips located on the label is connected in an electrically conducting manner by way of the bridging to the inner connection of the NFC antenna, that the outer connection of the NFC antenna is connected in an electrically conducting manner to a further contact point arranged on the label, and that each of the contact points is connected in an electrically conducting manner by a conductor track running on the substrate to the outer connection by way of the further contact point, a switch that is interrupted in the initial state being respectively arranged in each of these conductor tracks.

Because they are formed as a label, the technical components can in this case be easily dispensed and connected in an electrically conducting manner to the substrate directly face to face by way of their contact points.

When creating such a device, an advantageous possibility is provided for combining the NFC antenna and the NFC chips with the other components. It is also of advantage here that an initially interrupted NFC antenna can be coupled to a plurality of chips and there are for this purpose contact points for directly joining face to face with the substrate material. This allows production of an NFC communication with multiple NFC chips with flexibly selectable switches in a form suitable for mass production.

A label according to the invention for use in such a device or a printed item provides
- a film-like main body,
- an NFC antenna formed on the label, printed on, etched or punched out, with a number of windings and also an inner connection and an outer connection,
- a bridging, which is connected in an electrically conducting manner to the inner connection and is led in an insulated manner from the windings into the region outside the NFC antenna,
- wherein in each case one of the connections of each of the NFC chips located on the label is connected in an electrically conducting manner respectively to a contact point,
- wherein the other connection respectively of each of the NFC chips located on the label is connected in an electrically conducting manner by way of the bridging to the inner connection of the NFC antenna, and
- wherein the outer connection of the NFC antenna is connected in an electrically conducting manner to a further contact point arranged on the label.

In order to be able to produce devices according to the invention with a particularly small thickness and a particularly small area of the labels, it may be provided
- that the NFC antenna is formed on the substrate, printed on, etched or punched out, and has a plurality of windings and also an inner connection and an outer connection, the individual windings of the NFC antenna running in at least one bridging region such that they are spaced apart next to one another, in particular in parallel,
- that the label is arranged extending over the bridging region and has a contact point, which is in electrically conducting contact with the inner connection of the NFC antenna,
- that in each case a connection of the NFC chips located on the label is connected in an electrically conducting manner to this contact point, and
- that the other connection respectively of each of the NFC chips located on the label is in conducting contact by in each case a further contact point with a region of the substrate that is located outside the NFC antenna, and
- that each of the further contact points is connected in an electrically conducting manner by way of in each case one of the conductor tracks running on the substrate to the outer connection of the NFC antenna, a switch that is interrupted in the initial state being respectively arranged in each of these conductor tracks.

Furthermore, the antenna size and antenna form of the desired application are often dependent on the target group of the respective printed item and its NFC-enabled devices. The use of the proposed label provides the advantage that the NFC antenna can be printed completely variably in terms of size and form in series production, so that the label can be used for a large number of applications with different antennas and receiver devices.

An NFC communication can be produced with a large number of data communication devices particularly easily and reliably if the NFC antenna has
- outer dimensions with a width of 40 to 80 mm, in particular 60 to 80 mm, and a height of 110 to 150 mm, preferably a width of 74 mm and a height of 131 mm, and/or
- a number of 3 to 7 windings, in particular with a line thickness of in each case less than 3 mm, preferably 4 windings with a line thickness of 1.5 to 2.5 mm and a layer thickness of less than or equal to 40 µm, in particular if the NFC antenna is printed on paper by means of conductive silver lacquer by the screen printing process, and/or
- in particular an overall resistance of less than or equal to 25 ohms.

A further label according to the invention for use in such a device or a printed item provides
- a film-like main body,
- a contact point, in particular for connection to the inner connection of an NFC antenna,
- a number of NFC chips located on the label, in each case a connection of the NFC chips being connected in an electrically conducting manner, in particular by way of conductor tracks, to this contact point,
- a number of further contact points, the other connection respectively of each of the NFC chips located on the label being in electrically conducting contact with in each case a further contact point, and
- a bridging region, formed in an insulating manner, which separates from one another the surface region in which the contact point is arranged from the surface region in which the further contact points are arranged, the bridging region being designed in particular to insulate each conducting element of the label in the bridging region and the bridged windings electrically from one another.

An arrangement according to the invention for easily transmitting data by means of NFC technology provides a device according to the invention and also an NFC-enabled data communication device, which by actuating one of the switches is in data communication connection with one of the NFC chips by way of the NFC antenna.

According to the invention, also provided is a switch for use in a device according to the invention or a printed item, comprising two substrates and also switch elements arranged on one of the substrates and also lying opposite one another on the substrate and the further substrate and facing one another, at least one of the switch elements having, facing the other switch element respectively, an insulating surface layer, in particular an oxide layer, which is preferably arranged between the two switch elements and electrically insulates them from one another in the initial state, in particular wherein the switch elements are arranged in such a way that the at least one insulating surface layer of one of the switch elements when exposed to a force normal to the plane of extent of the substrate breaks or tears or is elastically deformed and a contact is produced between the two switch elements.

In order to ensure that a switch does not inadvertently lose its functioning, for example when stacking devices or printed items according to the invention, or become damaged by heavy loads, it may be provided that the switch elements running on the substrate have two connections interrupted by an interruption, which are electrically insulated from one another in the initial state, and that arranged on the region of the further substrate that is opposite the switch element is a further switch element, which is designed to come into electrically conducting contact with each of the connections of the switch element when exposed to force in such a way as to bridge the interruption and connect in an electrically conducting manner the connections of the switch elements interrupted by an interruption. Furthermore, with this measure, easier conductor track routing is achieved.

In order to achieve the effect that a switch is not constantly conducting unintentionally or because of a production fault, or in order to avoid the situation where a switch is activated during the stacking of a large number of substrates one on top of the other that is performed in the production process and especially in the further processing of the printed items, it may be provided that at least one of the switch elements, possibly both switch elements, is formed by a layer of conducting material with a superficially insulating coating, in particular of superficially oxidized aluminum or with a superficially conductive material, in particular conductive silver lacquer, which is preferably coated with a partially applied, curing, and preferably electrically insulating, material such as relief lacquer or UV-curing adhesive, and wherein possibly the opposite switch element is formed with superficially electrically conductive material, in particular conductive silver lacquer.

It may preferably be provided for this purpose that the substrate and the further substrate are adhesively bonded to one another, and that region of the substrate and/or of the further substrate in the region of or within a surrounding area of the switch elements is kept free of the adhesive connecting two substrates to one another.

A method according to the invention for producing a device according to the invention provides the following steps:

establishing the position of a data communication device with reference to the substrate and, dependent thereon, establishing the position of the NFC antenna with respect to the substrate, establishing the position of switches with reference to the substrate, assigning control commands to be performed on the data communication device or links to the individual switches, establishing the position of the label and the conductor tracks with reference to the established positions of the data communication device and the switches, in particular selecting a printed image and the printing format for the substrate used for producing the device and printing the printed image onto the substrate, preferably on the side of the substrate opposite from the conductor tracks, applying the conductor tracks to the substrate, creating or positioning the switches or switch elements on the substrate or the substrates, programming the NFC chips and transmitting the control commands or links to the NFC chips, applying the label and making the contact points on the substrate contact the contact points of the label.

In order also to be able to produce devices or printed items with a printed front side and a printed rear side, with which the technical components that are located between the substrates are scarcely perceptible, the following steps may be provided in the case of a production method according to the invention:

providing a further substrate, in particular, selecting a printed image for the side of the further substrate that is facing away from the substrate and establishing the printing format of the further substrate in accordance with the printing format of the substrate and printing on the further substrate in accordance with the prescribed printed image, possibly forming further switch elements on that side of the further substrate that is facing the conductor tracks of the substrate, in the regions of the switches, joining together, in particular adhesively bonding, the mutually facing sides of the substrate and the further substrate provided with switch elements.

A simplified production method for a device printed on both sides, which requires only a single substrate, provides in particular, applying a priming on the side on which the conductor tracks are located and/or selecting a further printed image for that side of the substrate of the device on which the conductor tracks are located, in accordance with the printing format of the substrate, and overprinting the side of the substrate on which the conductor tracks are located with the selected further printed image.

An easy method for producing a device with which an NFC communication with a large number of data communication devices can be created particularly easily and reliably provides that, on the basis of the form and position of a number of NFC reader antennas of prescribed data communication devices, in particular cell phones, a surface area is determined, comprising all of the positions which, with reference to an edge established in a fixed position and alignment with respect to the substrate or further substrate, preferably the upper edge, or a position, for example the center point, of the respective data communication device, are included or covered by the NFC reader antennas of the data communication devices concerned when they lie against the prescribed edge aligned in one and the same direction, or are aligned on the basis of the position, such as for example the center points of the data communication devices, that possibly a marking is applied on the substrate or on the further substrate, indicating at which location the data communication device is to be placed in order that the respective NFC reader antenna of the corresponding data communication device is in the receiving range of the NFC antenna located on the substrate or on the label, and that the position and alignment of the NFC antenna with respect to the substrate or the further substrate is established such that the outer dimensions of the NFC antenna extensively cover the surface area or at least extensively overlap in at least one region in each case the positions that are included by the NFC reader antennas of the data communication devices concerned.

The invention also comprises a switching arrangement which is suitable for programming or writing to an NFC chip not provided with an NFC antenna by way of an NFC programming unit likewise not provided with an NFC antenna. This switching arrangement comprises an NFC programming arrangement, which is designed to program in combination with a coil arranged downstream of it an NFC chip likewise provided with a coil. In this case, it is provided that a transformer is provided, that the connections of the NFC programming arrangement are connected to the coil of the first side of a transformer, and preferably the other side or coil of the transformer is intended for connection to an NFC chip, in particular that a capacitor which is dimensioned such that the resultant LC circuit applied to the programming unit possibly resonates at 13.56 MHz is connected in parallel with the coil.

With this switching arrangement it is possible to program NFC chips in an easy way even when or at a point in time that they are not provided with an NFC antenna.

Further advantages and refinements of the invention emerge from the description and the accompanying drawings.

Particularly advantageous embodiments of the invention, which however are not to be understood as restrictive, are schematically represented hereafter on the basis of the accompanying drawings and are described by way of example with reference to the drawings, in which schematically:

BRIEF DESCRIPTION OF THE SEVERAL VIEWS OF THE DRAWING

FIG. 8 shows an exploded representation of a first embodiment of the invention with a label, on which multiple NFC chips and a common NFC antenna are applied, FIG. 32 shows a surface area for communication with a large number of mobile radio devices with different NFC reader antenna forms and positions, FIG. 33 shows the various NFC reader antenna forms of the data communication devices, FIG. 34 shows an exemplary embodiment of an antenna geometry.

DESCRIPTION OF THE INVENTION

Figure 1:
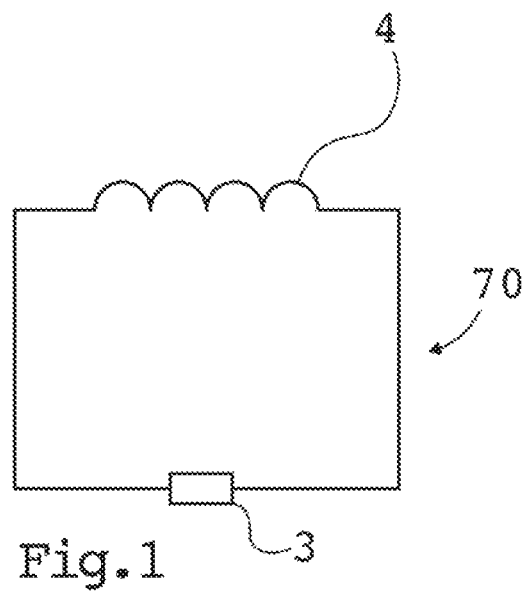
FIG. 1 shows the schematic setup of a conventional NFC tag with an NFC antenna and an NFC chip.
Figure 2:
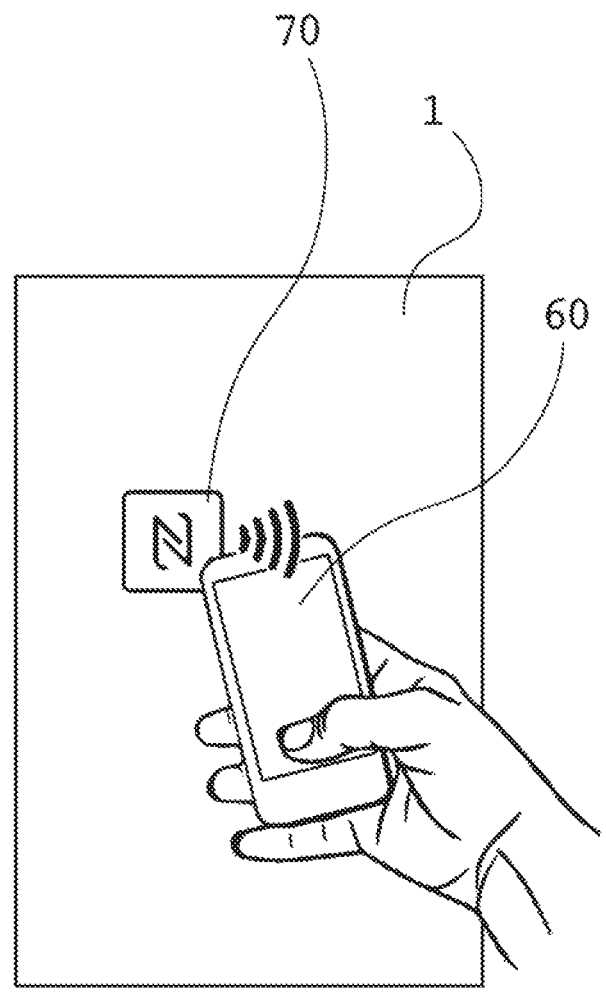
FIG. 2 shows the application of a conventional NFC tag integrated in a substrate.

FIG. 1 and FIG. 2 schematically show the setup of an NFC tag 70 known from the prior art with an NFC antenna 4 and a single NFC chip 3 and also the basic functioning or operation of an NFC tag 70 known from the prior art. If a user brings his NFC-enabled data communication device 60 close to the NFC tag 70, a coupling of the NFC antenna 4 of the NFC tag 70 and a further NFC reader antenna 61 of the mobile NFC-enabled data communication device 60 takes place by means of electromagnetic induction, so that a data exchange is possible between the NFC tag 70 and the NFC-enabled data communication device 60.

The data to be transmitted is in this case stored on the NFC chip 3 of the NFC tag 70. The NFC tag 70 usually does not have an energy supply of its own and the energy required for the data exchange is taken from the electrical or magnetic field of the data communication device 60.

Such NFC tags 70 with an integrated circuit are for example integrated in customer cards or debit cards, in order to enable contactless payment by means of NFC technology at NFC-enabled sales locations. However, NFC tags are for example also integrated on labels of garments or in print media, in order to enable a user to call up by means of his NFC-enabled data transmission device 60 items of information stored on the NFC chip 3. For this purpose, NFC tags 70 are integrated in a material, such as for example paper, polymer or fabric.

FIG. 2 shows a substrate 1, in the form of a page of a printed item, such as for example a magazine, with, provided on it, an NFC tag 70, on which a link is stored. A user or reader of the magazine can, by bringing a mobile NFC-enabled data communication device 60 up close, open the link on his NFC-enabled data communication device 60.

As a result, the user can for example gain access to further contents on a prescribed website in that, after data communication has taken place on his NFC-enabled data communication device 60, the associated website opens. A disadvantage of such NFC tags 70 is however that only a single link can be stored on each NFC tag 70.

A further disadvantage of such NFC tags 70 is that the user is only provided with a restricted possibility of interaction with the print medium.

Although the device represented in FIG. 2 can in principle be integrated in print media and can likewise be produced in thin substrates, such as for example pages of paper, the added value associated with use is not especially great, since, in a way similar to the use of a QR code, only a single link or a single item of information can be transferred, and therefore there are only few possibilities of interaction. The reader is led away from the printed content to his NFC-enabled device. In particular, there is also no return link to this medium that would lead the reader back again to the printed content. Consequently, when providing the supplementary digital content, the publisher runs a high risk of readers abandoning the print medium.

In addition, the NFC tag shown here is constantly active, which, in addition to the high cost per unit and production costs that are incurred for each further NFC tag to be provided, makes it difficult to integrate multiple of these NFC tags in a print medium. This is so because, if multiple of these NFC tags are integrated in a print medium, because of the small surface-area extent of print media, such as for example journals, undesired items of information of another NFC tag that the reader does not want may be called up, since multiple NFC tags 70 are ready at the same time for data transmission with the NFC-enabled data communication device 60.

The invention provides a remedy in this respect and enables a user to choose interactively, for example on a page of a print medium by means of switches integrated in the substrate 1, between a number of data to be displayed, and only display the desired content on an NFC-enabled data communication device 60.

Figure 3:
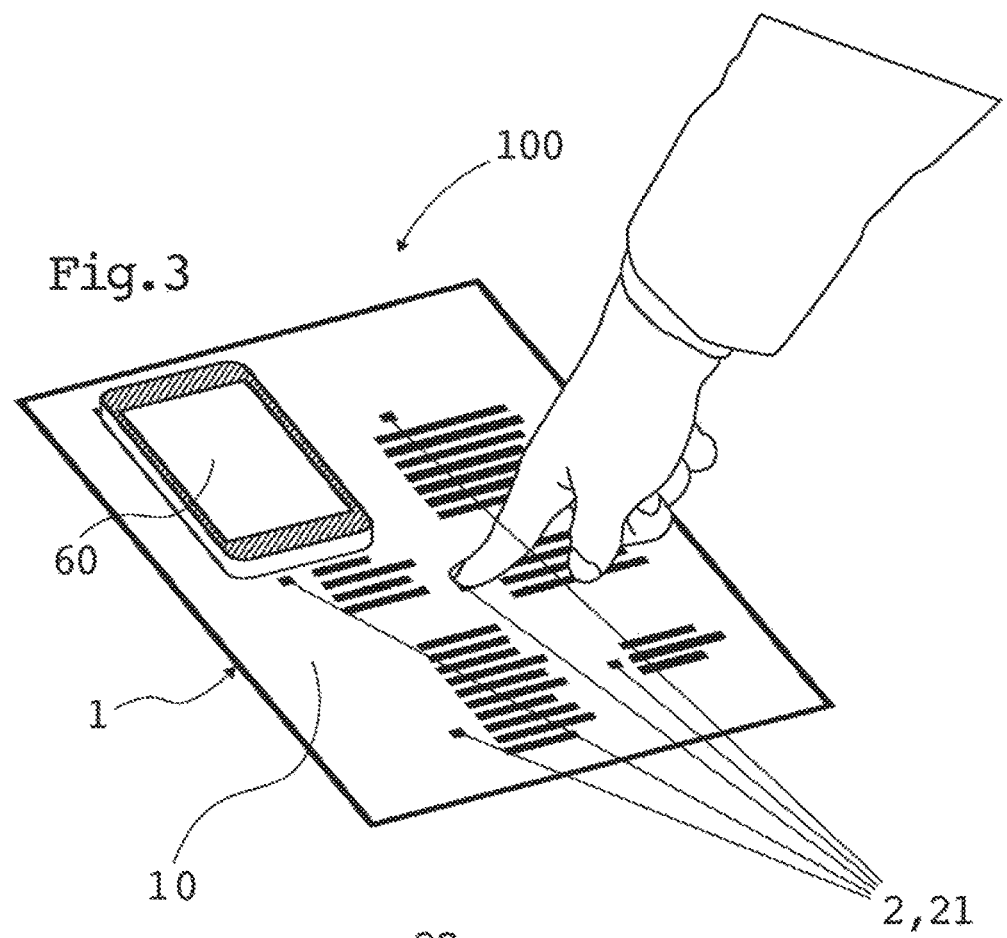
FIG. 3 and FIG. 4 show the basic operation in the case of a first embodiment according to the invention, FIG. 5, FIG. 6 and FIG. 7 schematically show possible circuit variants for the examples represented in FIG. 3 and FIG. 4.

FIG. 3 shows a device 100 in the form of a printed item, comprising a substrate 1 and a further substrate 10 with, arranged between the two substrates 1, 10, five switches 2, which are interrupted in their respective initial state. The switches 2 are arranged between the substrate 1 and the further substrate 10. The position of the switches 2 is indicated on the substrate 10 by markings 21, which are located on the substrate 10 on a side of the device 100 that is facing the user. FIG. 3 also shows a mobile NFC-enabled data communication device 60 placed on the device 100.

The substrates 1, 10 of the device 100 according to the invention represented in FIG. 3 are in this case made of a flexible material, such as for example paper or cardboard. The provision of the switches 2 according to the invention on the device 100 enables a user to call up certain items of information interactively by touching the further substrate 10. In this case, the user can, by actuating a switch 2, retrieve information assigned to the switch 2.

Figure 4:
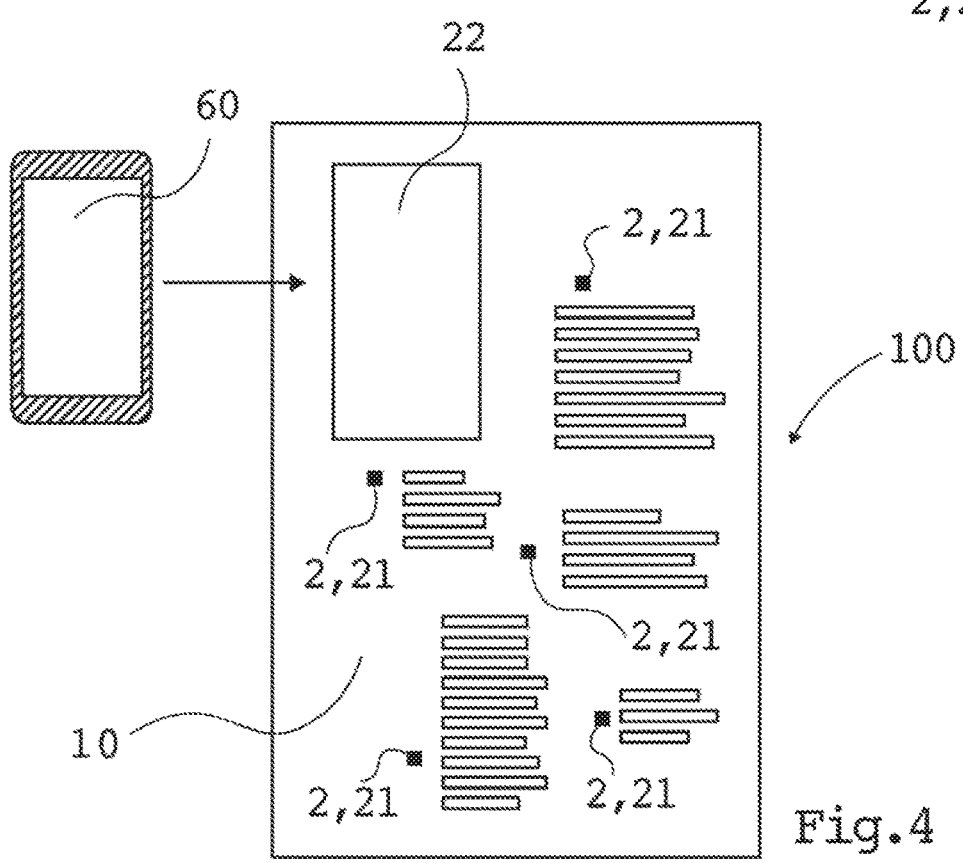

In FIG. 4, the graphic print layout of the device 100 shown in FIG. 3 is represented. The device 100 comprises a substrate 1 and also five switches 2, which are respectively marked on the substrate 10 by markings 21 on a side facing the user in the state of use. Also provided on the further substrate 10 is a marking 22, which indicates the position at which an NFC-enabled data communication device 60 is to be placed in the state of use.

In the case of the device 100 represented in FIG. 4, for example a page from a journal, the switches 2 or the markings 21 are in each case provided over or to the side of a block of text. The position of the switches 2 is in this case adapted during the production of the device 100 or in the printing process of the journal to the position of the markings 21, 22 prescribed in the layout. The marking 21 of the switches 2 in the printed image makes the user aware of the position at which the switches 2 are located and which items of information can be called up.

FIGS. 3 and 4 show the basic operation in the case of an embodiment according to the invention. The embodiment according to the invention offers publishers of print media and the users or readers a large number of advantages in comparison with conventional NFC applications and also in comparison with technical software trials of links between a print medium and a digital medium. The device 100 according to the invention allows a plurality of links to be called up by touching marked locations on that surface. As a result of innovation in the areas of production methods, NFC components, switches and linking between electronics and print, the invention allows that technology to be integrated, scarcely perceptibly for the user, between thin layers of paper within a printing process.

The calling up of multiple links by way of a single NFC antenna 4 by touching the substrate 100 offers the extended option of progressing to contents that go into more depth, by which new ways of implementing processes are made possible within a link between print and digital media. For example, the locations marked on the substrate material may be in a sequence. The procedures performed by way of the links may be stored by way of the cookies of the website called up. The next contents called up by actuating the switches may progressively build on the procedures carried out by way of the previous switches. Consequently, a new form of implementing processes by way of a haptic medium in combination with electronics becomes possible. This offers valuable new options for the ordering of products in the retail and gastronomy industries.

A further significant factor is the touching of the paper, which proves to be particularly effective as a means of multisensory marketing. For instance, it is scientifically proven that, in marketing, a pleasing feel encourages the tenancy to conclude a purchase and that information experienced by feel can be learnt and recalled more quickly. By interactively engaging with an advertisement, for example, the user becomes emotionally attached to the subject. Consequently, a resonance and retentiveness is aroused in the consumer.

This offers print media for example considerable advantages both for editorial contents and advertising. The reader can be directed by way of multiple switches to carry out multiple procedures.

The connection between the print medium and the digital medium allows for example reader numbers and further conversions to be directly read or derived from the print medium. The interest of the individual customer can be ascertained by the number of respective times the switches are touched and the calling up of items of information by way of the smartphone.

Consequently, the device according to the invention is also of particular interest for purposes of market research. It can also be meaningfully used when integrated in packagings, in order to perform a certain communicating function in a sales transaction.

When used by the final consumer, a positive user experience can be achieved, for example as a result of interactive, attractive and easily understandable operating instructions, which if need be may also include explanatory videos or other multimedia contents, in order to achieve a customer tie-in by linking the packaging and/or the operating instructions with for example sites featuring the brand on social media. Similarly, other items of digital information, such as for example purchasing suggestions for additional, complementing products, can be retrieved.

The factors given by the meaningful combination of haptic and digital aspects lead to the device 100 according to the invention being highly effective as a learning aid. It is very effective especially for instructions and any type of material for further education.

Similarly, the technology can be meaningfully incorporated in a variety of different further applications, such as for example boardgames, in order to offer the user elements of interactive involvement and an exciting experience.

Figure 5:
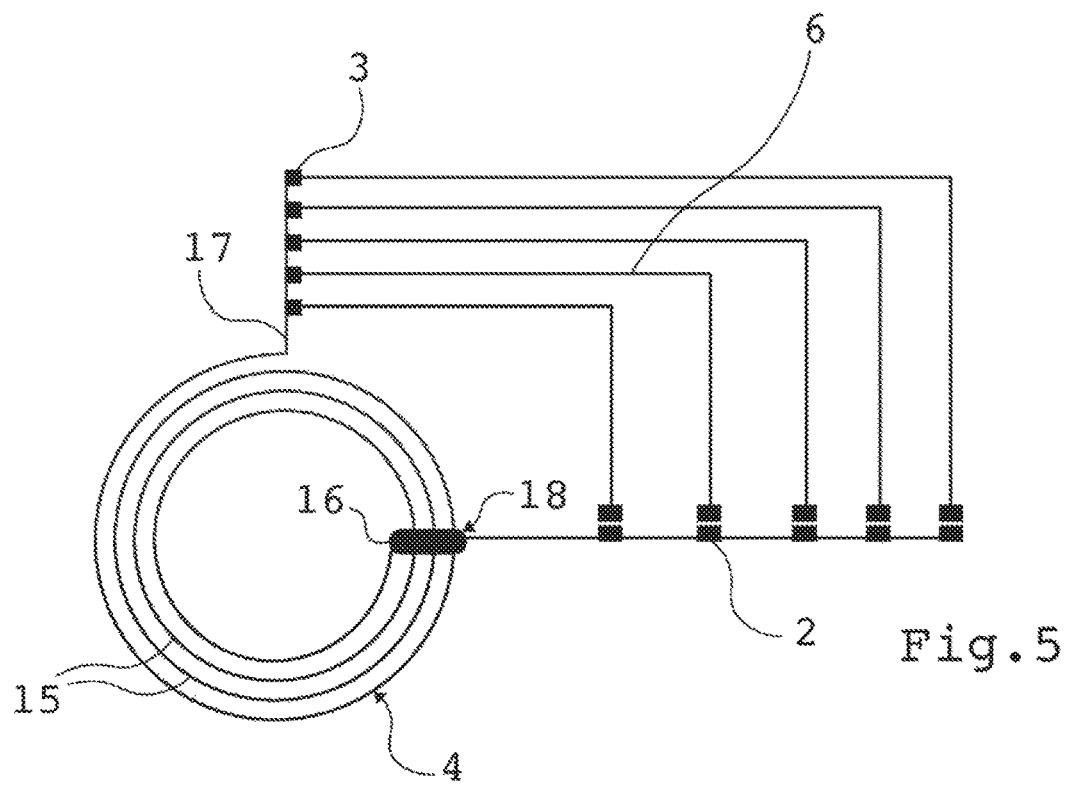
Figure 6:
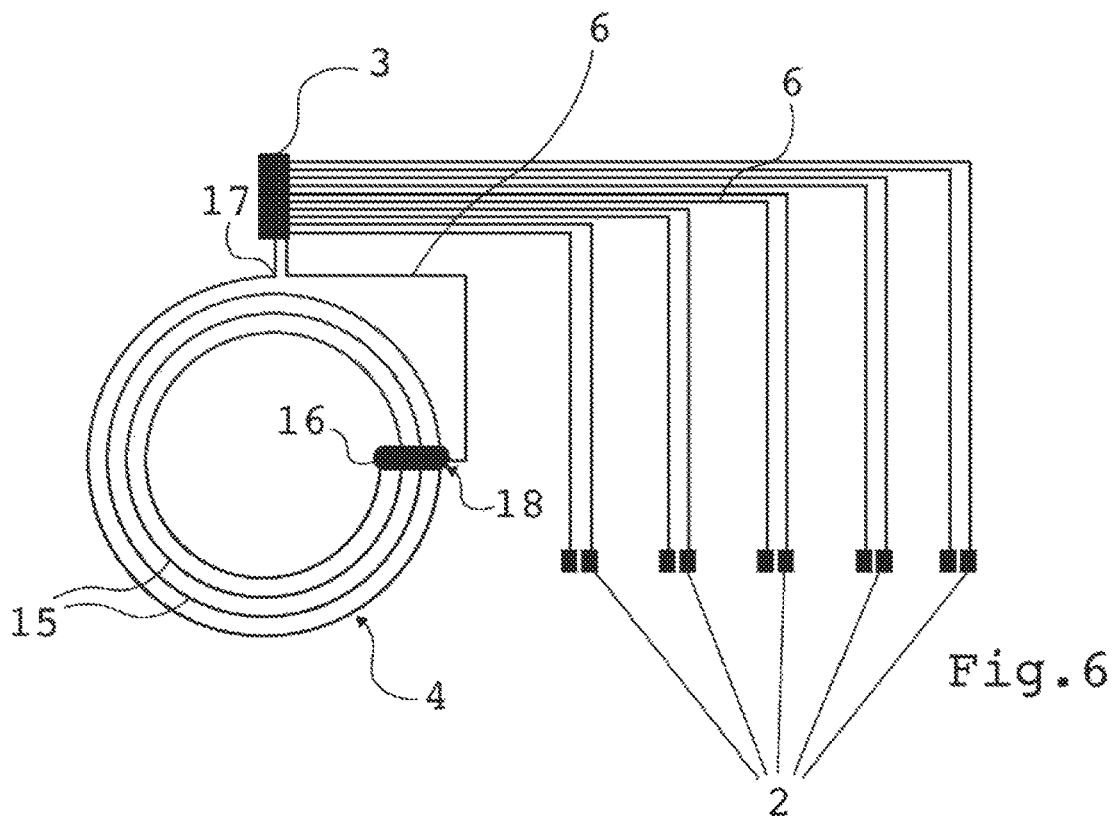

FIG. 5 and FIG. 6 show in each case a possible interconnection of the devices 100 represented in FIG. 3 and FIG. 4. FIG. 5 shows in this case an NFC antenna 4, which is connected to five switches 2 arranged in parallel. The switches 2 are respectively assigned at least one NFC chip 3, the switches 2 and the NFC chips 3 assigned to them being respectively connected in series with one another. The individual series circuits thus created, respectively comprising one of the switches 2 and the NFC chip 3 assigned to it, are connected in each case to the NFC antenna 4. The connection between the switches 2, the NFC chips 3 and the NFC antenna 4 is in this case produced in each case by way of conductor tracks 6.

The NFC antenna 4 has in this case an inner connection 16 and an outer connection 17 and comprises windings 15. Also provided is a bridging 18, which is connected in an electrically conducting manner to the inner connection 16 and is led in an insulated manner from the windings 15 into the region outside the NFC antenna 4. For insulating the bridging 18, a layer of electrically insulating material, such as for example electrically insulating adhesive, is arranged between the windings 15 of the NFC antenna 4 and the bridging 18.

In this case, the NFC antenna 4 is arranged on the side of the device 100 that is facing away from the user in the operating state behind the marking 22 for the NFC-enabled data communication device 60, while the switches 2 are arranged behind the markings 21.

If an NFC-enabled data communication device 60, for example an NFC-enabled cell phone, is placed on the marking 22, electrical energy is transmitted by way of the NFC antenna 4 and, when a switch 2 is actuated, is passed on to the NFC chip 3 assigned to it. Upon actuation, the NFC chips 3 transmit the information stored on them or stored commands to the NFC-enabled data communication device 60 by way of the NFC antenna 4, for example by load modulation. These items of information can then be displayed or performed on the NFC-enabled data communication device 60.

In the case of all of the embodiments of the invention, the windings 15 of the NFC antenna 4 and the conductor tracks 6 may in principle be printed onto the device 100 in a printing process. For this purpose, the windings 15 of the NFC antenna 4 and the conductor tracks 6 may consist of a thinly applied, electrically conductive material, such as for example conductive silver lacquer, aluminum, copper or a conducting polymer, or comprise this material.

In the case of the combination represented in FIG. 6 of an NFC antenna 4 with switches 2, by contrast with the example in FIG. 5, only one common NFC chip 3 is provided. As in FIG. 5, the NFC chip 3 is connected by way of the outer connection 17 to the NFC antenna 4 and is connected by way of conductor tracks 6 respectively to one of five switches 2. The NFC chip 3 is in turn supplied with voltage by way of the NFC antenna 4.

Provided in this case in the NFC chip 3 are transistors, which react capacitively, so that, when one of the switches 2 is closed, the desired signal is transmitted back to the NFC antenna 4 and is received by the NFC-enabled data communication device 60. In this case, depending on which of the switches 2 is closed, the respective item of information or the respective command can be retrieved from the assigned NFC chip 3.

Figure 7:
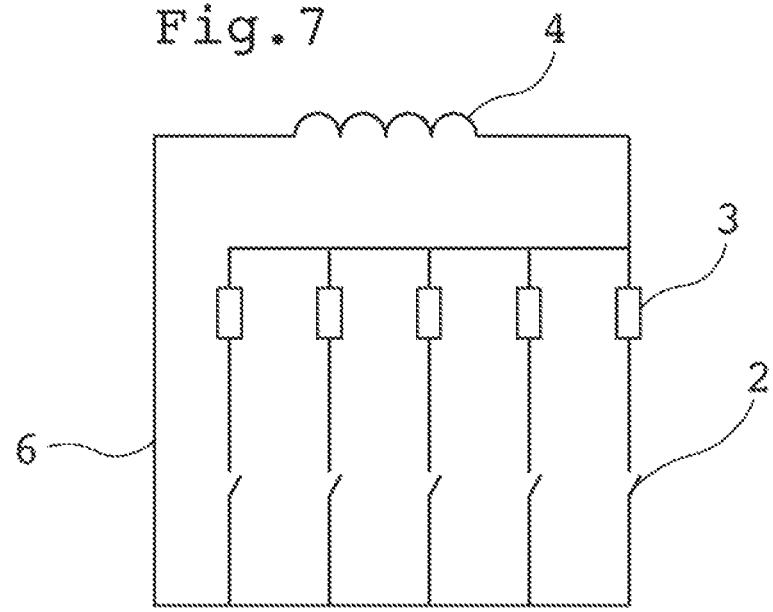

FIG. 7 shows the schematic setup of a first embodiment of the invention. The NFC antenna 4 is connected by way of conductor tracks 6 to the NFC chips 3 and the switches 2, and the NFC chips 3 and the switches 2 are respectively connected in series. This has the effect of forming a circuit, which can be closed or can be interrupted again by actuating one of the switches 2.

Figure 9:
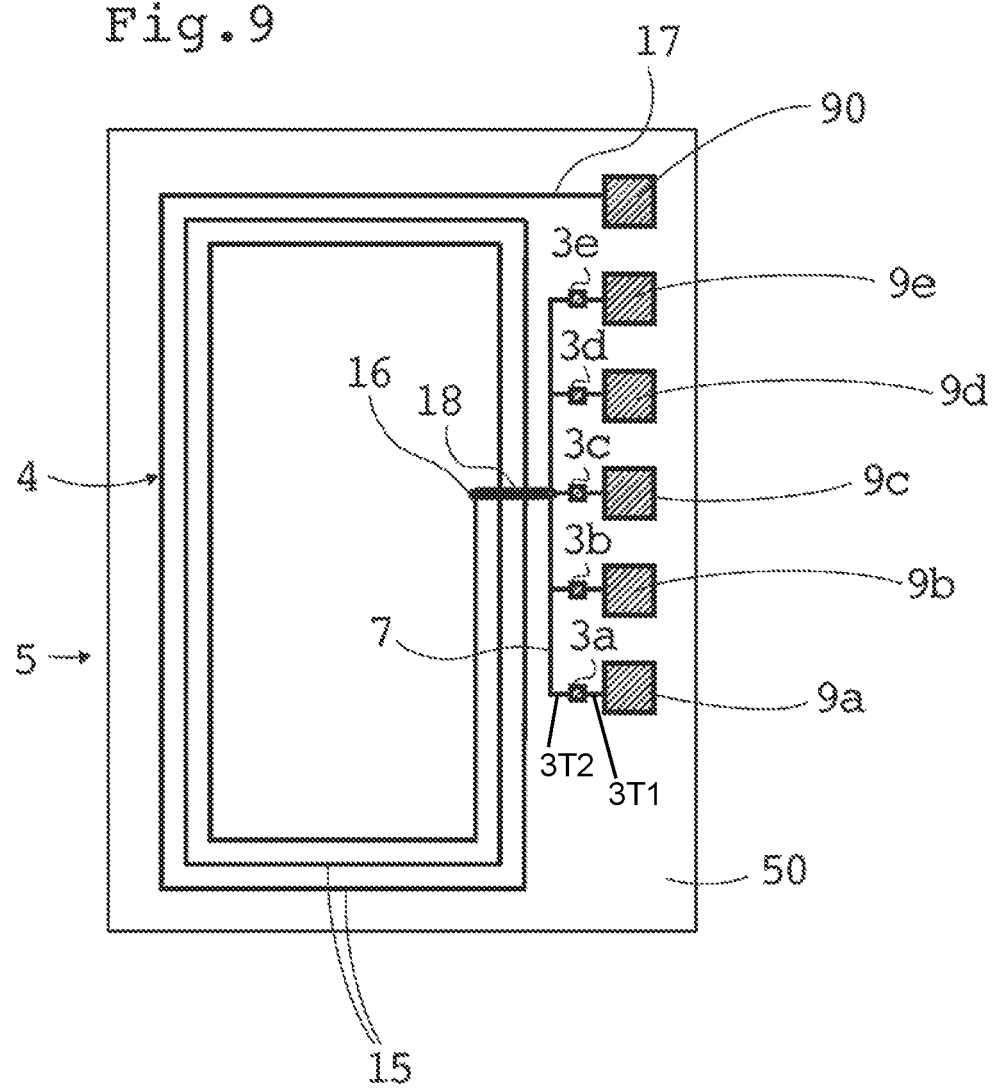
FIG. 9 shows the label represented in FIG. 8 in detail, FIG. 10 schematically shows the interconnection in the case of the first embodiment of the invention represented in FIG. 8.

FIG. 8 and FIG. 9 show the setup of a first preferred embodiment of the invention, in which a label 5 is used, on which NFC chips 3a, . . . 3e and also an NFC antenna 4 are provided. The NFC antenna 4 is formed on the label 5, in particular punched out, etched or printed on, and has a plurality of windings 15 and also an inner connection 16 and an outer connection 17. Also provided is a bridging 18, which is connected in an electrically conducting manner to the inner connection 16 and is led in an insulated manner from the windings 15 into the region outside the NFC antenna 4.

In each case one of the connections 3T1 of each of the NFC chips 3a, . . . 3e located on the label 5 is connected in an electrically conducting manner respectively to a contact point 9a, . . . , 9e and the other connection 3T2 respectively of each of the NFC chips 3a, . . . 3e is connected in an electrically conducting manner by way of the bridging 18 to the inner connection 16 of the NFC antenna 4.

The outer connection 17 of the NFC antenna 4 is connected in an electrically conducting manner by way of a conductor track 7 to a further contact point 90 arranged on the label 5, and each of the contact points 9a, . . . , 9b on the label side is connected in an electrically conducting manner by way of a conductor track 6 running on the substrate 1 to the outer connection 17 by way of the further contact point 90 on the label side. In this case, in each of these conductor tracks 6 there is respectively arranged a switch 2a, . . . , 2e, which is interrupted in the initial state and is made up of the switch elements 11, 12.

The device 100 comprises a substrate 1 and a further substrate 10, between which the five switches 2a, . . . 2e are arranged. The switches 2a, . . . 2e are respectively connected by way of conductor tracks 6 to contact points 8a, . . . 8e, 80 on the substrate side, in the present case the contact points 8a, . . . 8e, 80 on the substrate side and the conductor tracks 6 being made of one and the same material. Arranged on the substrate 1 is a label 5 with a film-like main body 50, the label 5 being joined face to face with the substrate 1.

In comparison with conventional NFC devices, the device 100 according to the invention offers ecological and commercial advantages for incorporating in a print medium multiple links that can be called up, since the labels (5, 5') according to the invention together with printed conductor tracks mean that both fewer materials and fewer dispensing units are required in production.

It also proves to be particularly advantageous for production that few NFC components have to be bought in from external manufacturers. For each device, a producer of a print medium only has to use one label for a plurality of available NFC chips, while, in the case of the variants known previously from the prior art, each usable chip required a further NFC tag to be bought. The device 100 according to the invention dispenses with the need for all those materials and costs that have previously occurred due to the provision of each further NFC tag.

In the case of the first embodiment, represented in FIG. 9, an NFC antenna 4 and also five NFC chips 3a, . . . , 3e are arranged on the label 5. The NFC antenna 4 has an inner connection 16 and an outer connection 17, and also a bridging 18. The NFC chips 3a to 3e are connected by way of conductor tracks 7 to the NFC antenna 4 and to the bridging 18. Also provided on the label 5 are contact points 9a, . . . , 9e, 90, which are connected by way of conductor tracks 7 to the NFC chips 3a, . . . , 3e.

The label 5 is arranged on the substrate 1 of the device 100 in such a way that the switches 2a, . . . 2e are provided on the substrate 1 in a region different from the label 5. The contact points 8a, . . . , 8e, 80, 9a, . . . , 9e, 90 arranged on the label 5 and the substrate 1 are in this case arranged in such a way that they are facing one another, and the conductor tracks 6, 7 on the label 5 and on the substrate 1 are in electrically conducting contact with one another.

The conductor tracks 6 on the substrate 1 and also the conductor tracks 7 on the label 5, which are connected to one another in an electrically conducting manner by way of the contact points 8a, . . . , 8e, 80, 9a, . . . , 9e, 90, consequently form an electrical circuit, which can be closed or can be interrupted by the switches 2a, . . . 2e. It is consequently possible for a user, by actuating one of the switches 2a, . . . 2e, to transmit a signal from the NFC chip 3a, . . . 3e assigned to the respective switch 2a, . . . 2e to the NFC-enabled data communication device 60.

The device 100 comprises a further substrate 10, on which five markings 21 are arranged, behind which the switches 2a, . . . 2e are arranged on the substrate 1. As a result, it is indicated to a user of the device 100 at which location a switch 2a, . . . 2e is to be actuated in order to retrieve a desired item of information that is identified on the substrate 10. A further marking 22, which identifies to a user of the device 100 where an NFC-enabled data communication device 60 is to be arranged in order to read out items of information by actuating the switches, is arranged on the substrate 10.

Quite generally, the substrates 1, 10 may be produced from a flexible, pliant material, such as for example paper, and be adhesively bonded to one another. The conductor tracks 6, 7 on the label 5 and/or on the substrate 1 are electrically conductive layers, which are created in particular by electrically conductive lacquer or consist of conductive lacquer. Alternatively, the conductor tracks 6, 7 may also be produced from conducting films, conducting inks or other electrically conductive substances.

It is consequently possible to apply the conductor tracks 6 on a substrate 1, 10 in a printing process such that they are formed as particularly thin and, for a user of the invention, cannot be felt through a substrate 1, 10.

In the case of the embodiment shown in FIG. 8, the label 5 is connected by way of the contact points 8a, . . . , 8e, 80, 9a, . . . , 9e, 90 to the conductor tracks 6 that are provided on the substrate 1 or the first paper layer. The adhesive bonding or joining of the substrate 1 and the substrate 10 has the effect for a user of the device 100 that the conductor tracks 6, 7 and the label 5 can no longer be seen.

If a user places an NFC-enabled data communication device 60, for example a cell phone, on the marking 22 on the substrate 10 of the device 100 under which the label 5 is located and actuates one of the switches 2a . . . 2e manually, for example by pressing with a finger, the respective circuit is closed. An NFC communication between the NFC-enabled data communication device 60 and one of the NFC chips 3a, . . . , 3e that is assigned to the respective switch 2a, . . . , 2e is built up and it is possible for example for a link that is stored on the respective NFC chip to be opened on the NFC-enabled data communication device 60.

The contact points 8a, . . . , 8e, 80, 9a, . . . , 9e, 90 arranged facing one another on the substrate 1 and the label 5 are likewise electrically conductive layers, which are in particular created by conductive lacquer or consist of conductive lacquer. The conductive lacquer is in this case formed as superficially conducting, preferably non-oxidizing, and consists in particular of silver.

The provision of the conductor tracks 6 as thin layers during the printing process allows even very thin substrates 1, 10, such as for example thin paper, to be used, so that the electronic components, such as for example conductor tracks 6 or contact points 8a, . . . , 8e, 80, can scarcely be felt by a user. Furthermore, such a device 100 according to the invention can also be produced by way of known printing processes, so that such a device 100 can be produced inexpensively. The use of NFC technology means that the invention can also be operated without an external power supply, such as for example batteries.

Alternatively, it is also possible that the device 100 has only one substrate 1 and one label 5, so that the label 5 and the substrate 1 are not covered by a further substrate 10 for example. In this case, there is preferably the possibility of overprinting the side of the device 100 on which the label as well as the conductor tracks are provided after they have been applied and making them less visible to the user.

Figure 10:
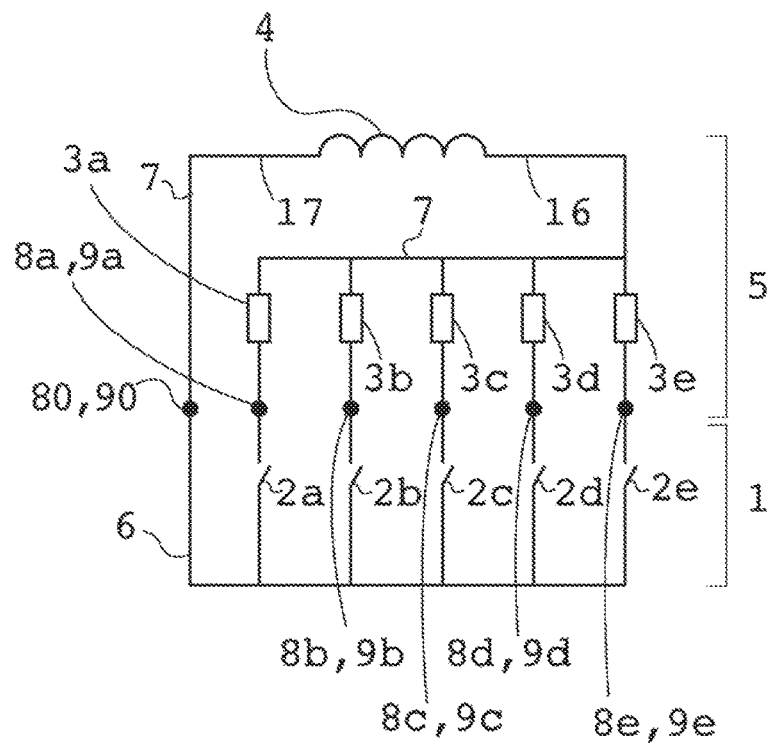

FIG. 10 shows the schematic setup of the embodiment of the invention represented in FIG. 8. In this case it can be seen that a closed circuit can only be produced by combination of a substrate 1 and a label 5. In this case, switches 2a, . . . , 2e and also conductor tracks 6 and contact points 8a, . . . , 8e, 80 are arranged on the substrate 1. An NFC antenna 4, NFC chips 3a, . . . , 3e, conductor tracks 7 and also contact points 9a, . . . , 9e, 90 are arranged on the label 5.

The NFC antenna 5 has in this case an inner connection 16 and an outer connection 17 and the NFC chips 3a, . . . , 3e and also the switches 2a, . . . , 2e are respectively connected in series. If a label 5 is placed on a substrate 1, the conductor tracks 6, 7 form a circuit, which can be closed or can be interrupted by actuating one of the switches 2a, . . . , 2e.

In order to enable a user to manually actuate a switch 2, 2a, . . . 2e, for example by pressing with a finger, at least one of the switches 2, 2a, . . . 2e may be formed by two conductor tracks 6, 7 arranged on the substrate 1 and the label 5 that lie opposite one another and are facing one another. The switch 2, 2a, . . . 2e has in this case switch elements 11, 12, at least one of the switch elements 11, 12 having an insulating surface layer 110, 120, in particular an oxide layer.

The insulating surface layer 110, 120 is in this case formed in particular in such a way that the conductor tracks 6, 7 can be brought into contact by exposing one of the switch elements 11, 12 to a force normal to the plane of extent of the substrate 1. The conductor tracks 6, 7 are in this case arranged in such a way that at least one insulating surface layer 110, 120 of one of the switch elements 11, 12 breaks or tears when a force normal to the plane of extent of the substrate 1 is exerted.

In the case of a device 100 according to the invention with such switches 2, 2a, . . . 2 that can be easily actuated manually, an interruption 13 may be optionally provided for the conductor tracks 6 running on the substrate 1 in the region of the switches 2, 2a, . . . 2e. The interruption 13 in this case interrupts the switches 2, 2a, . . . 2e, and the conductor tracks 6 have in the region of the switches 2, 2a, . . . 2e switch elements 11. Further switch elements 12, which are designed to bridge the interruption 13 when exposed to force normal to the plane of extent of the substrate 1, 10 are in this case arranged on the region of the further substrate 10 that is lying opposite the switch elements 11. As a result, the switch elements 11 can be connected in an electrically conducting manner to the further switch elements 12.

At least one of the switch elements 11, possibly both switch elements 11, 12, are in this case formed by a layer of superficially conducting material, such as for example oxidized aluminum, and the possibly further switch element 12 is formed by superficially electrically conductive material, in particular conductive silver lacquer.

Figure 11:
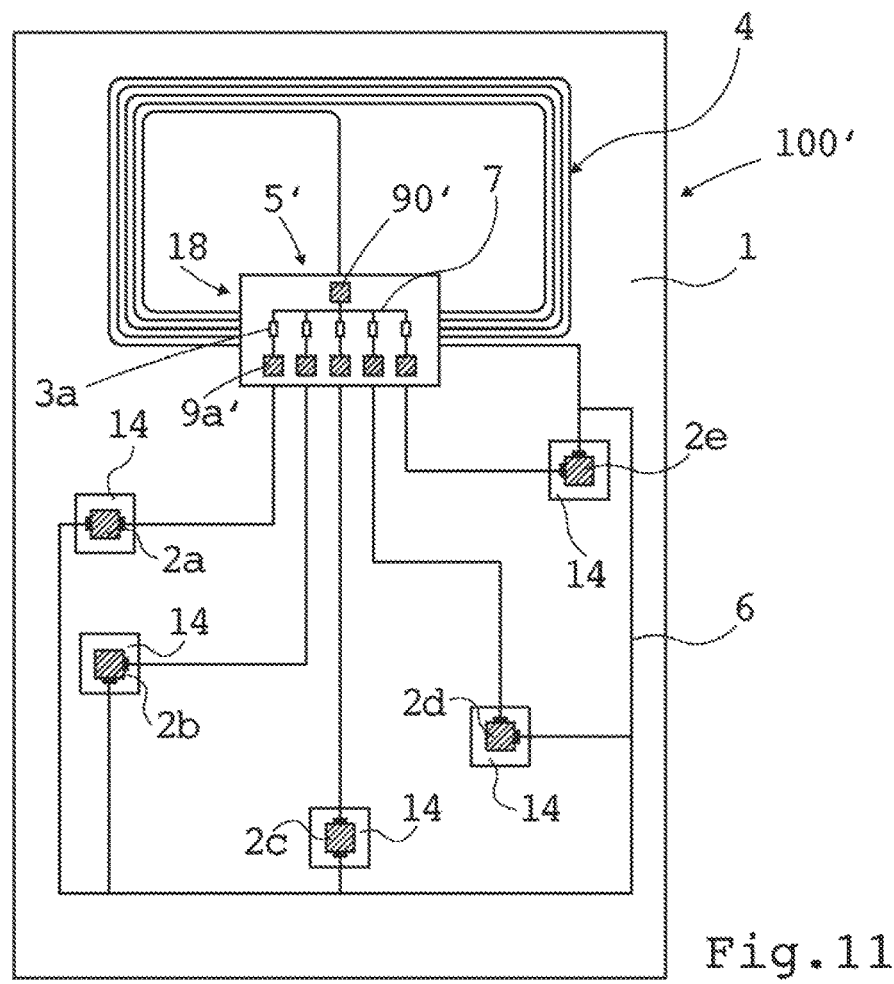
FIG. 11 shows a second preferred embodiment of the invention.

In the case of a second embodiment of the invention, the NFC antenna 4 and the conductor tracks 6 may be applied directly on the substrate 1, for example as a conductive lacquer, by a printing process, so that for example only NFC chips 3a, . . . , 3e and also contact points 9a', . . . , 9e', 90' and conductor tracks 7 are arranged on the label 5'. FIG. 11 shows such a second preferred embodiment of the invention with a label 5', on which the NFC chips 3a, . . . , 3e are applied, a bridging 18 of the NFC antenna 4 in the form of a coil or spiral also being ensured by the label 5'. That is to say that the label 5 of the second embodiment performs the function of the bridging 18.

In the case of the embodiment shown in FIG. 11, the device 100' comprises a substrate 1 with five switches 2a, . . . , 2e arranged on the substrate 1, which are connected to conductor tracks 6. Also arranged on the substrate 1 is an NFC antenna 4, which, like the conductor tracks, may preferably be printed directly onto the substrate 1 within the same procedure. The switches 2a, . . . , 2e are respectively arranged separately on further labels 14, the further labels 14 being arranged on the substrate 1. This allows further, possibly even known, switches 2a, . . . , 2e, for example even snap disk switches, also to be incorporated in the devices 100, 100' according to the invention.

The device 100' may also comprise a further substrate 10, so that the further labels 14 are in this case arranged between the substrate 1 and the substrate 10. The switches 2a, . . . , 2e may however also be formed in any other way desired.

Figure 12:
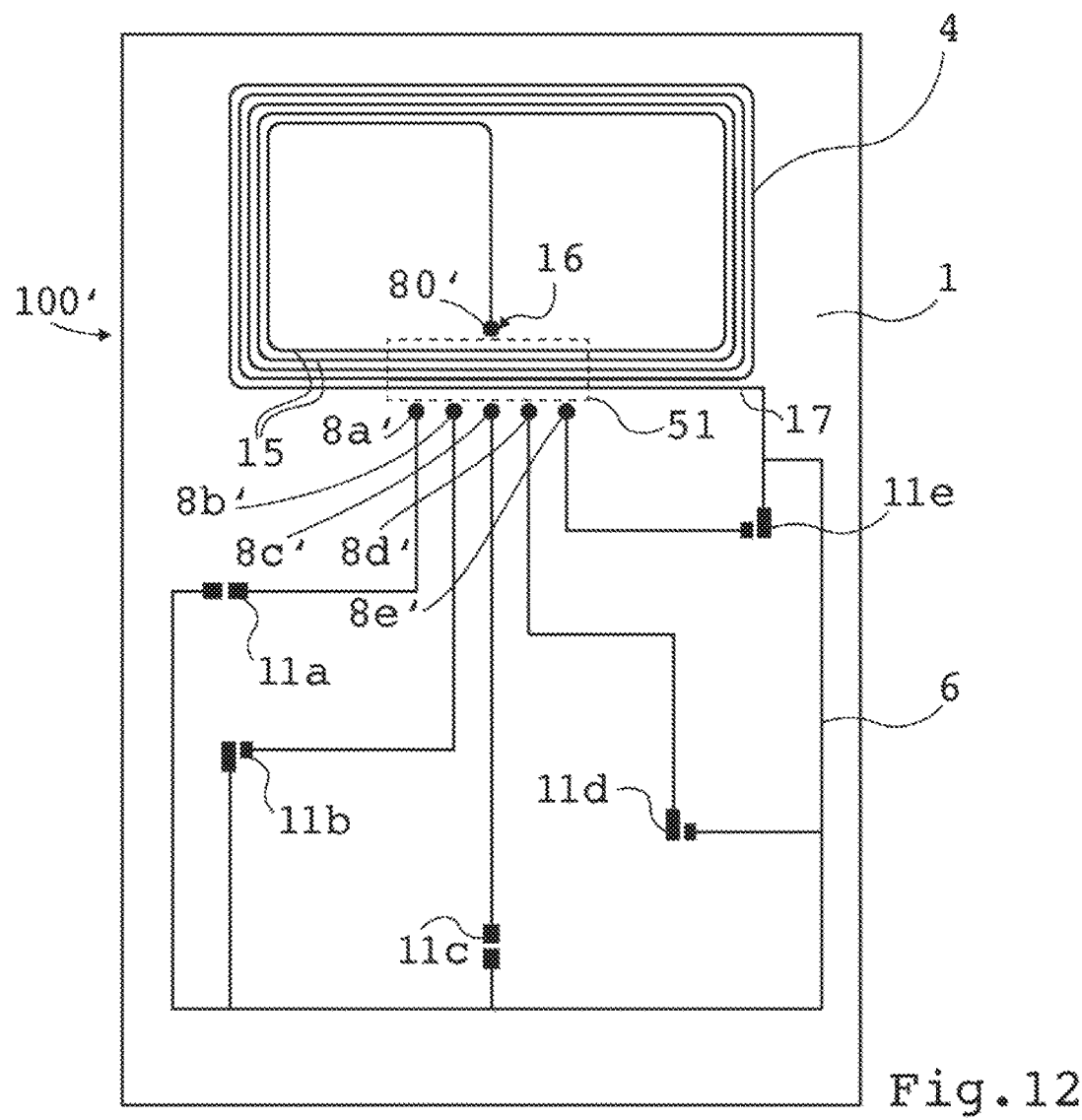
FIG. 12 shows an electronics print layout view of the embodiment of the invention represented in FIG. 11 without a label and without supplementary switch elements.

FIG. 12 shows a variant of an electronic layout of the substrate 1 of the second embodiment of the invention, represented in FIG. 11, without the label 5' and also the further labels 14. FIG. 12 shows in this case the NFC antenna 4, applied on the substrate 1, and also five switch elements 11a, . . . , 11c for the switches 2a, . . . , 2e, applied on the substrate 1. The switches 2a, . . . , 2e are in this case connected in an electrically conducting manner by the combination of switch elements 11a, . . . , 11c and further labels 14 by way of conductor tracks 6.

The NFC antenna 4 in FIG. 12 also comprises an inner connection 16 and an outer connection 17, the outer connection 17 being connected to the conductor tracks 6. The switches 2a, . . . , 2e are also connected by way of conductor tracks 6 to contact points 8a', . . . , 8e', a bridging region 51 being formed between the contact points 8a', . . . , 8e' and the inner connection 16 of the NFC antenna 4. The NFC antenna 4 is formed as printed onto the substrate 1 and the windings 15 are formed running in the bridging region 51 such that they are spaced apart next to one another, in particular in parallel.

In FIG. 11, it can also be seen that the label 5' is arranged extending over the bridging region 51 and has a contact point 90, which is in electrically conducting contact with the inner connection 16 of the NFC antenna 4.

Figure 13:
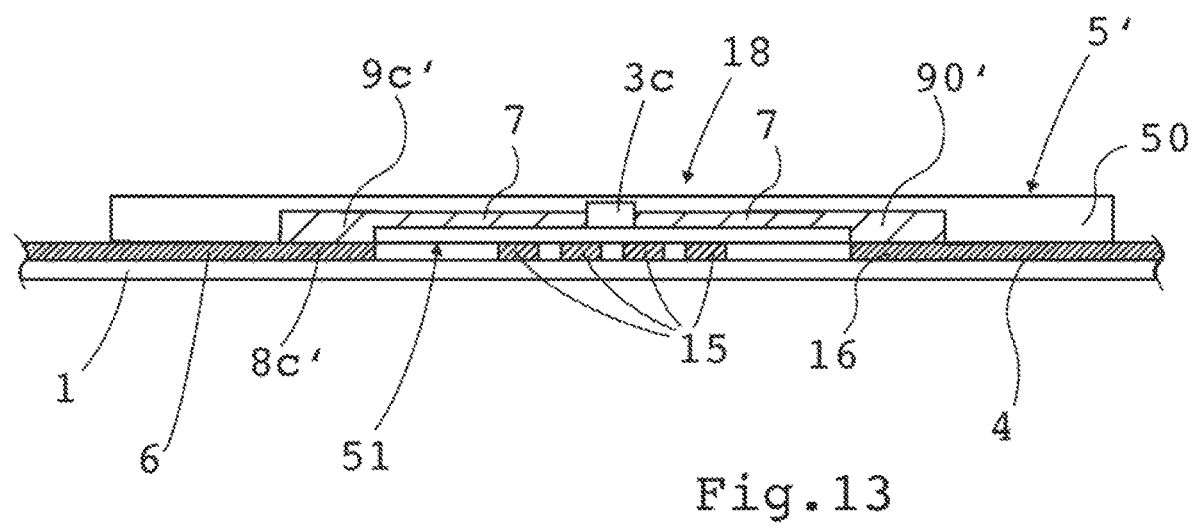
FIG. 13 shows a sectional view of part of the second embodiment, represented in FIG. 11 in the region in which the label bridges the NFC antenna.

At the same time, in each case a connection of the NFC chips 3a, . . . , 3e located on the label 5 is connected in an electrically conducting manner to the contact point 90, which is also shown in detail in FIG. 13.

The other connection respectively of each of the NFC chips 3a, . . . , 3e located on the label 5' is in conducting contact by in each case a further contact point 9a, . . . , 9e with the contact points 8a', 80' located on the substrate 1 that are located outside the NFC antenna 4. Each of the further contact points 9a, . . . , 9e is connected in an electrically conducting manner by way of a conductor track 6 running on the substrate 1 to the outer connection 17 of the NFC antenna 4. At the same time, a switch 2a, . . . , 2e that is interrupted in the initial state is respectively arranged in each of the conductor tracks 6.

FIG. 13 shows a sectional view through the bridging region 51 of the second embodiment of the invention, represented in FIG. 11. In this case it can be seen that the label 5' arranged on the substrate 1 or the main body 50 is connected to the substrate 1 of the device 100'. The contact points 8a', 80' on the substrate 1 are in electrically conducting contact with the contact points 9a', 90' of the label 5'. The contact point 80' is in this case located at the inner connection 16 of the NFC antenna 4. The NFC chip 3a is connected in a conducting manner by way of conductor tracks 7 to the contact point 9a', 90'. The windings 15 of the NFC antenna 4 are consequently electrically insulated in the bridging region 51 by the bridging 18.

Figure 14:
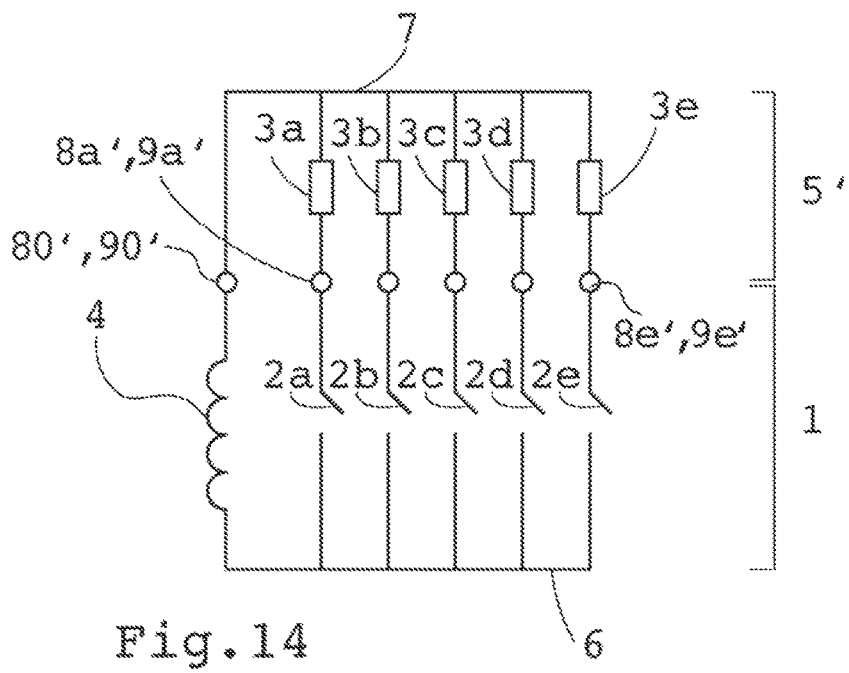
FIG. 14 shows the schematic setup of the second embodiment, represented in FIG. 11.

In FIG. 14, the circuit of the embodiment of the invention shown in FIG. 11 is schematically represented. In this case it can be seen that the NFC antenna 4 and also the five switches 2a, . . . , 2e are arranged on the substrate 1. The substrate 1 also comprises contact points 80', 8a', . . . , 8e', the contact points 80', 8a', . . . , 8e' being connected in an electrically conducting manner to the switches 2a, . . . , 2e or the NFC antenna 4 by way of conductor tracks 6.

Arranged on the label 5' are five NFC chips 3a, . . . , 3e, which are connected in an electrically conducting manner by way of conductor tracks 7 to contact points 90', 9a', . . . , 9e'. Consequently, by arranging a label 5' in such a way that the contact points 80', 8a', . . . , 8e' on the substrate 1 are in contact with the contact points 90', 9a', . . . , 9e' on the label 5', an electrical circuit can be produced. This circuit can be closed or can be interrupted by actuating a switch 2a, . . . , 2e on the substrate 1.

Figure 15:
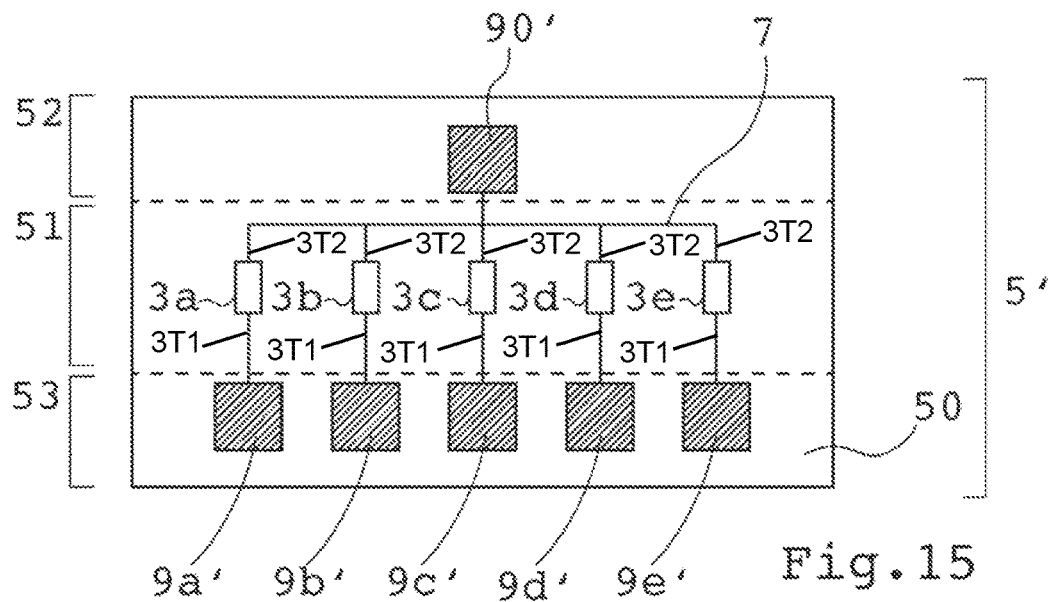
FIG. 15 shows the label represented in FIG. 11 in detail.

FIG. 15 shows a view of a detail of the label 5' represented in FIG. 11. The label 5' comprises a film-like main body 50, a contact point 90', in particular for connection to the inner connection 16 of an NFC antenna 4, and also a number of NFC chips 3a, . . . , 3e located on the label 5'. At the same time, in each case a connection 3T2 of the NFC chips 3a, . . . , 3e is connected in an electrically conducting manner, in particular by way of conductor tracks 7, to the contact point 90'. The label 5' also comprises a number of further contact points 9a', . . . , 9e', the other connection 3T1 respectively of each of the NFC chips 3a, . . . , 3e located on the label 5' being in electrically conducting contact with in each case a further contact point 9a', . . . , 9e'.

In order to avoid a short-circuit between the windings 15 with respect to one another and also a short-circuit of the conductor tracks 7 on the label 5' with the windings 15, the label 5' is formed in an insulating manner in that surface region, referred to hereinafter as the bridging region 51, that is facing the substrate and bridges the windings 15. Adjoining the bridging region on both sides are two surface regions 52, 53. The first surface region 52 has a contact point 90', which is formed as leading outward and is in electrically conducting contact with the contact point 80' of the substrate. The second surface region 53 has a number of contact points 9a', . . . , 9e', which are formed as leading outward and in electrically conducting contact with the contact points 8a, . . . , 8e of the substrate. It is particularly advantageous for the adhesiveness of the label 5' if all of the surface regions not covered by the contact points 90', 9a', . . . , 9e' are provided with an adhesive layer.

In a surface region 52, the label 5' has a bridging region 51, which is formed in an insulating manner and in which the contact point 90' is arranged and is separated from a surface region 53, in which the further contact points 9a', . . . , 9e' are arranged.

Figure 16:
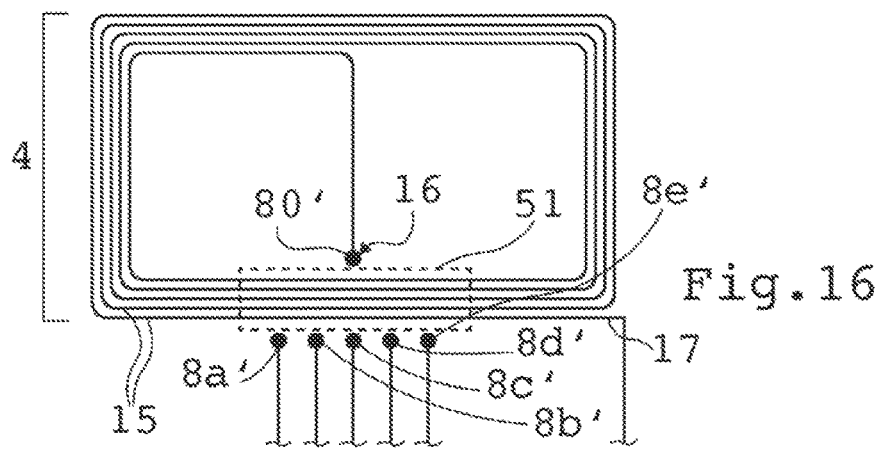
FIG. 16 shows the NFC antenna represented in FIG. 11 with an open bridging region.

FIG. 16 shows a detail of the substrate 1 represented in FIG. 12 in the region of the NFC antenna 4. It can be seen in it that the inner connection 16 and the outer connection 17 of the NFC antenna 4 are not electrically connected to one another.

On the substrate 1, the NFC antenna 4 and furthermore also the five switches 2a, . . . , 2e are arranged, which can also be seen in FIG. 14. The substrate 1 also comprises contact points 80', 8a', . . . , 8e', the contact points 80', 8a', . . . , 8e' being connected in an electrically conducting manner to the switches 2a, . . . , 2e or the NFC antenna 4 by way of conductor tracks 6.

The contact points 80', 8a', . . . , 8e' of the substrate 1 are in electrically conducting contact with the contact points 90', 9a', . . . , 9e'.

Since there are five NFC chips 3a, . . . , 3e, which are connected in an electrically conducting manner by way of conductor tracks 7 to contact points 90', 9a', . . . , 9e', arranged on the label 5', an electrical circuit can be produced by arranging a label 5' in such a way that the contact points 80', 8a', . . . , 8e' on the substrate 1 are in contact with the contact points 90', 9a', . . . , 9e' on the label 5'. This circuit can be closed or can be interrupted by actuating a switch 2a, . . . , 2e on the substrate 1.

Multiple embodiments of switches 2 according to the invention, which can be combined with all of the embodiments of a device 100, 100' according to the invention, are represented in FIG. 17 to FIG. 26.

Figure 17:
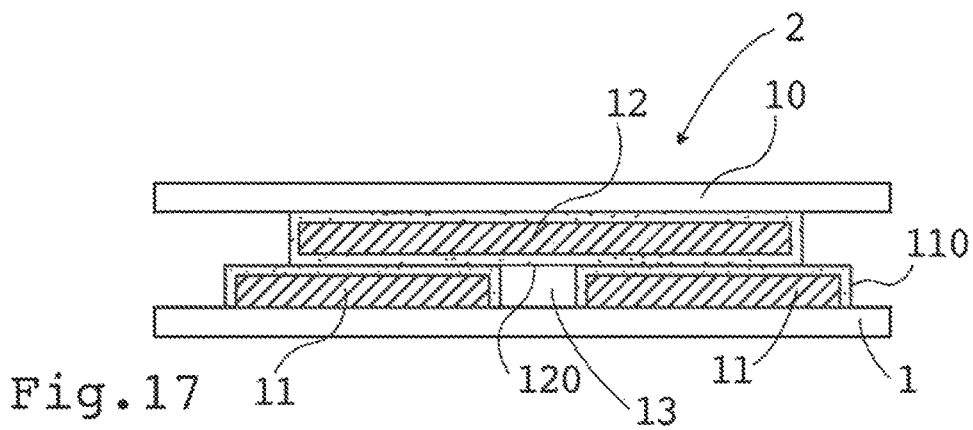
FIG. 17 shows a first embodiment of a switch according to the invention.
Figure 18:
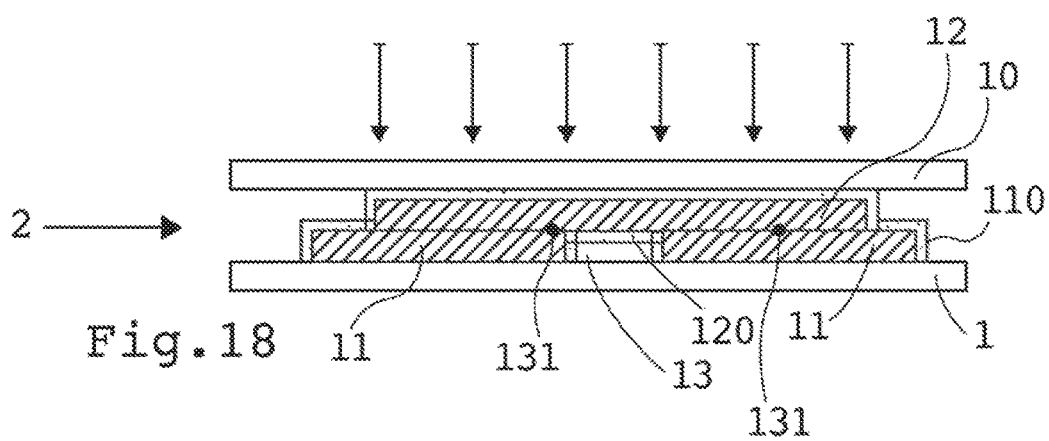
FIG. 18 shows the switch represented in FIG. 17 in the actuated state.

FIGS. 17 and 18 show a switch 2, comprising two substrates 1, 10, and also a switch element 11, which is located on the substrate 1, is interrupted in the actuating region of the switch 2 and has an interruption 13. Arranged on the region of the further substrate 10 that is opposite the switch element 11 is a further switch element 12, which lies opposite the switch element 11. The further switch element 12 is designed to bridge the interruption 13 in at least one contact point 131 when exposed to force normal to the direction of extent of the substrate 1, 10 and in such a way to connect in an electrically conducting manner the part of the switch element 11 that is interrupted by the interruption.

FIG. 17 shows the switch 2 in the deactivated position, no current being able to flow over the switch 2. In this case, the electrically conductive switch elements 11, 12 lying one on top of the other are arranged as electrically insulated from one another by an insulating surface layer 110, 120, in particular of superficially oxidized aluminum, aluminum adhesive tape or insulating adhesive. Alternatively, also only one of the switch elements 11, 12 may have an insulating surface layer 110, 120. Alternatively, the insulating surface layer 110, 120 may also consist of other oxidizing, electrically conductive materials, such as copper or conductive silver lacquer.

FIG. 18 shows the switch represented in FIG. 17 in the actuated state. In this case, a force acts normal to the plane of extent of the substrate 1, 10, whereby the insulating surface layer 110, 120 breaks or is destroyed in the region of the switch elements 11, 12. As a result, the interruption 13 in two contact points 131 is bridged and the parts of the switch element 11 are connected in an electrically conducting manner to one another by the further switch element 12. Consequently, by actuating a switch 2 according to the invention, a circuit can be closed, so that a voltage induced by way of an NFC antenna 4 can flow over the circuit.

Figure 19:
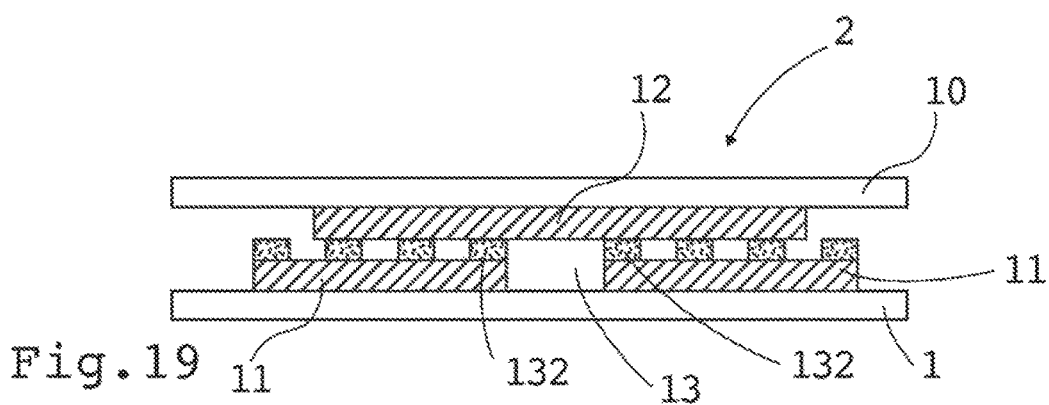
FIG. 19 shows a second embodiment of a switch according to the invention.

FIG. 19 shows a further embodiment of a switch 2 according to the invention, in the case of which, as in the case of the switch 2 represented in FIG. 17, a switch element 11 and a further switch element 12 are arranged opposite one another on the substrate 1, 10. Between the switch element 11 and the switch element 12, an electrically insulating material 132, such as for example electrically insulating adhesive, is applied in a fine grid. The application of the grid of the electrically insulating material 132 may in this case be realized in a printing process, and an interruption 13 may be arranged in the actuating region of the switch 2. Adhesive, in particular an adhesive or lacquer that is applied in a printing process and cures under UV light, comes into consideration for example as the insulating material.

Figure 20:
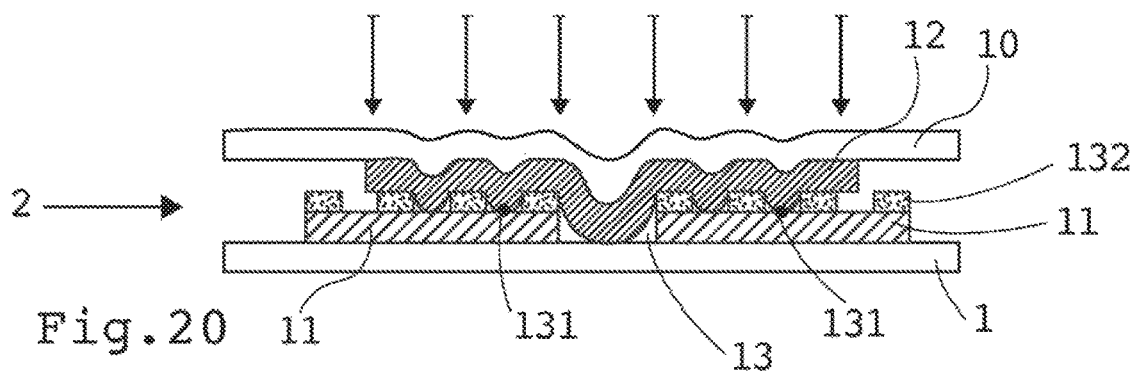
FIG. 20 shows the switch represented in FIG. 19 in the actuated state.

FIG. 20 shows the switch 2 represented in FIG. 19 in the actuated state. When a force is applied normal to the plane of extent of the substrate 1, 10, the flexible or pliant further switch element 12 adapts itself to the electrically insulating material 132 applied in a grid, so that at least two contact points 131 are formed, in that the further switch element 12 respectively contacts one of the two connections of the switch element 11 in an electrically conducting manner, or bridges its interruption 13, so that current can flow over the switch 2.

Figure 21:
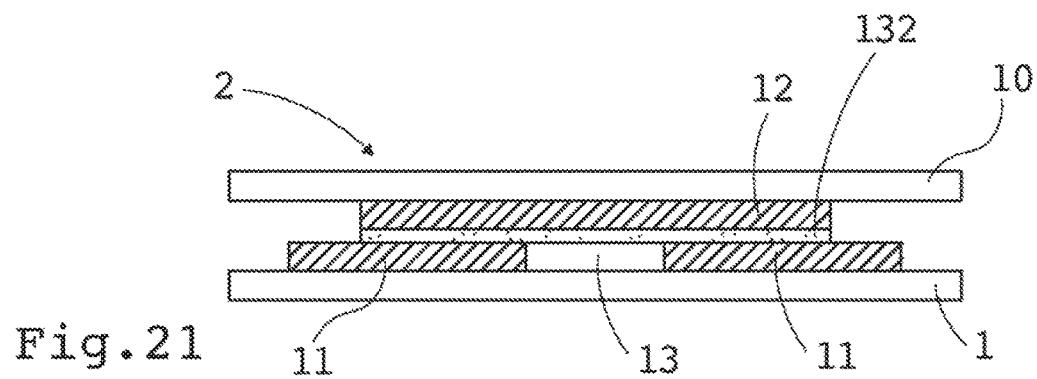
FIG. 21 shows a third embodiment of a switch according to the invention.

FIG. 21 shows a further embodiment of a switch 2 according to the invention. The switch 2 in this case comprises a substrate 1, 10 and also switch elements 11 and a further switch element 12, the switch 2 having a bridging 13, which is arranged in the actuating region of the switch 2. Arranged between the switch elements 11 and the further switch element 12 is a layer of electrically insulating material 132.

The layer is in this case formed continuously, so that it electrically insulates the further switch element 12 completely with respect to the switch elements 11 or the interruption 13. The layer of electrically insulating material 132 is an insulating elastic adhesive layer.

Figure 22:
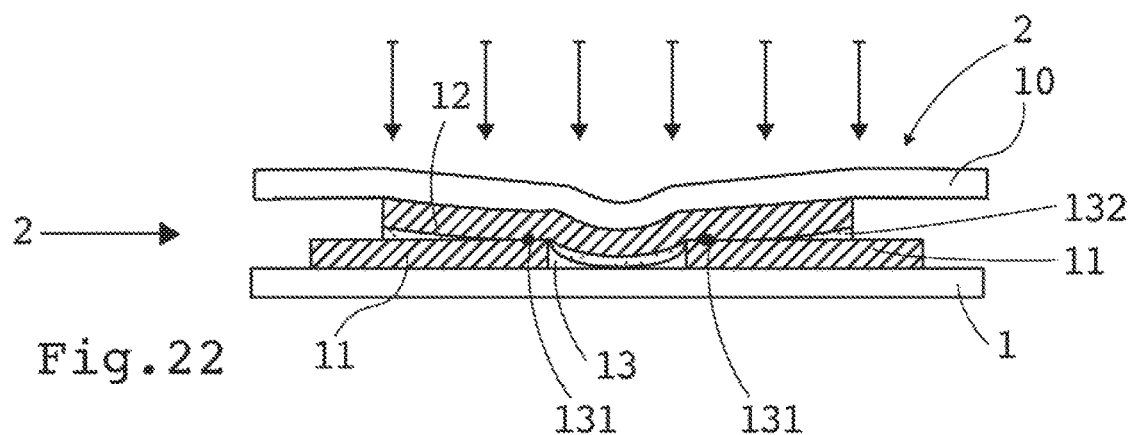
FIG. 22 shows the switch represented in FIG. 21 in the actuated state.

FIG. 22 shows the switch 2 represented in FIG. 21 in the actuated state. When a force is exerted normal to the plane of extent of the substrate 1, 10, the layer of the electrically insulating material 132 is deformed or displaced. As a result, at least two contact points 131 are formed, in that the switch elements 11 contact the further switch element 12 in an electrically conducting manner, so that current can flow over the switch 2.

After the end of the exposure to pressure, the layer of electrically insulating material 132 resumes its original form and the switch 2 is not constantly activated. Particularly suitable for the forming of such a switch 2 is a combination of conductive silver lacquer for forming the switch elements 11, 12 and a layer of elastic adhesive as the electrically insulating material 132.

Figure 23:
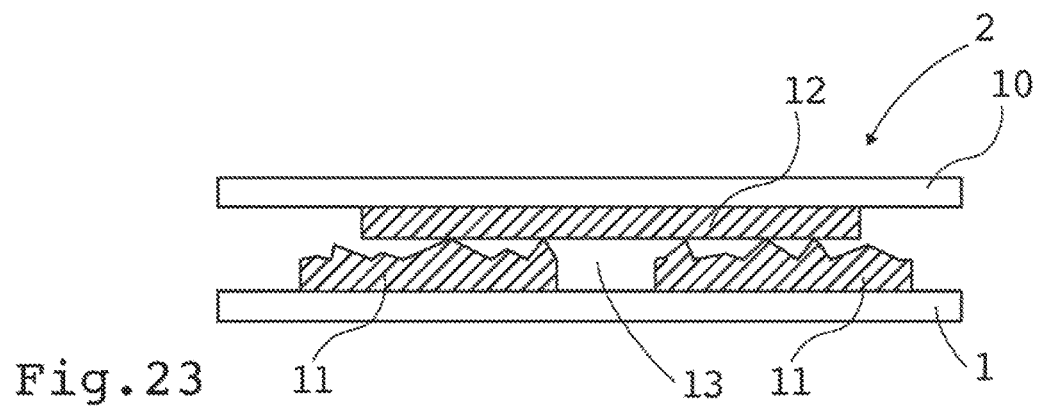
FIG. 23 shows a fourth embodiment of a switch according to the invention.

FIG. 23 shows a further embodiment of a switch 2 according to the invention. The switch 2 comprises a substrate 1 with a switch element 11 with two regions, which are separated by an interruption 13 and which have a relief on the side facing the further substrate 10. Arranged on the further substrate 10 is a further switch element 12, which contacts the switch elements 11 of the substrate 1 at points along the relief. The fact that the contact between the switch elements 11 and the further switch element 12 is only at points means that a sufficiently high resistance is ensured, so that no current can flow over the switch 2, and the NFC chip 3 is not supplied with energy by way of an NFC antenna 4.

Figure 24:
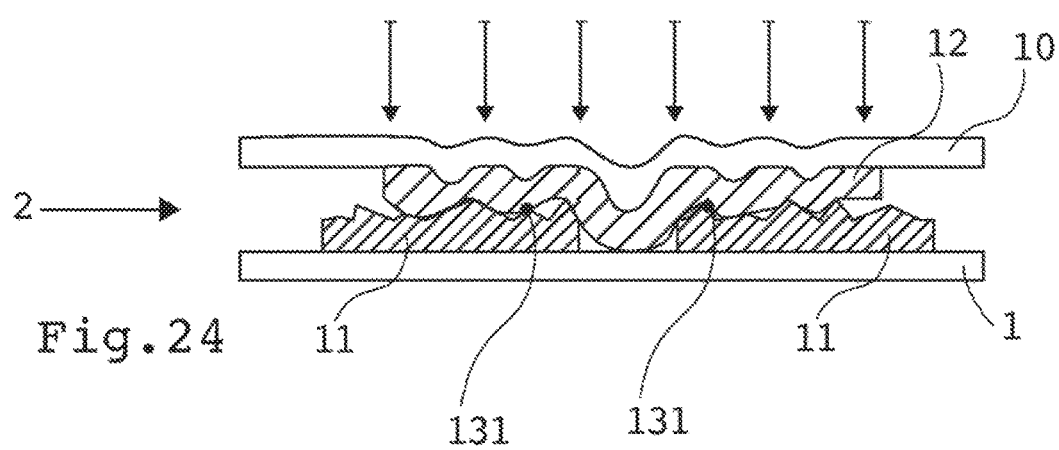
FIG. 24 shows the switch represented in FIG. 23 in the actuated state.

FIG. 24 shows the switch 2 represented in FIG. 23 in the actuated state. By exerting a force normal to the plane of extent of the substrate 1 or 10, the further switch element 12 is deformed and adapts itself to the relief of the switch element 11 of the substrate 1. As a result, at least in two contact points 131, the interruption 13 is bridged and the switch elements 11 and the further switch elements 12 are connected in an electrically conducting manner, so that current can flow over the switch 2.

Figure 25:
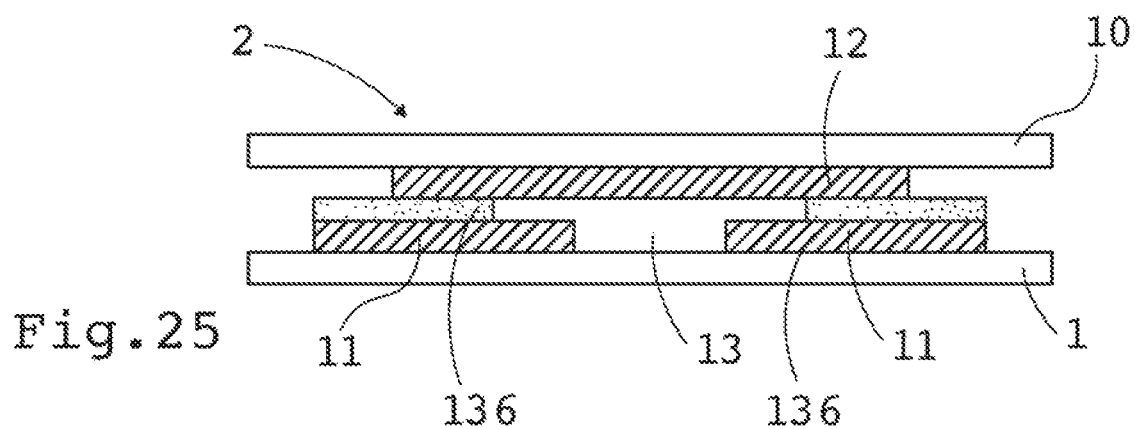
FIG. 25 shows a fourth embodiment of a switch according to the invention.

FIG. 25 shows a further embodiment of a switch 2 according to the invention. The switch 2 in this case comprises a substrate 1, 10 and also switch elements 11 and a further switch element 12, the switch 2 having a bridging 13, which is arranged in the actuating region of the switch 2. Arranged between the switch element 11 and the further switch element 12 there is specifically a layer of electrically insulating adhesive 136.

The layer is in this case formed continuously, so that it electrically insulates the further switch element 12 completely with respect to the switch element 11 or the interruption 13. The layer of electrically insulating adhesive 132 may be for example an insulating adhesive.

Figure 26:
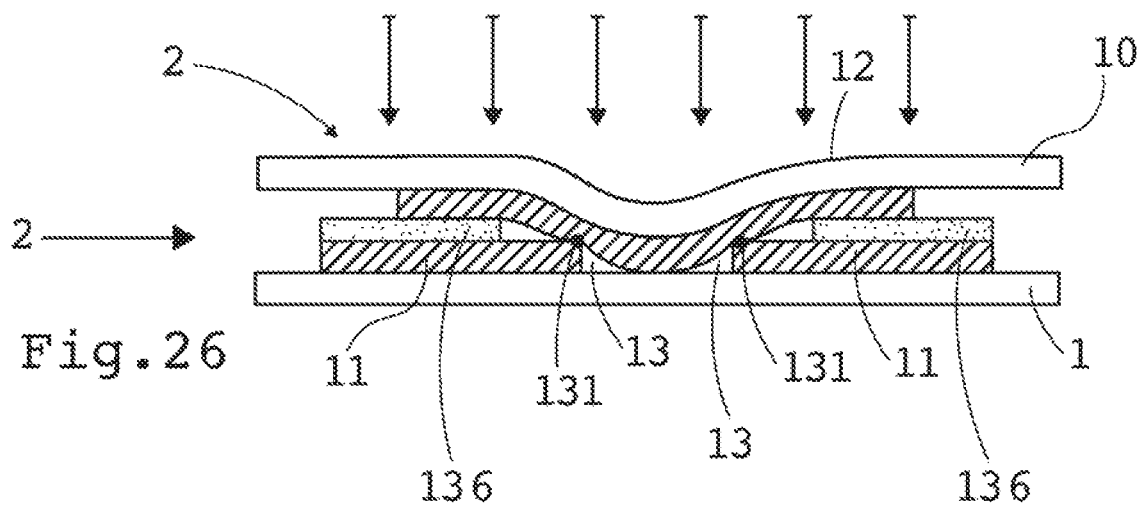
FIG. 26 shows the switch represented in FIG. 25 in the actuated state.
Figure 27:
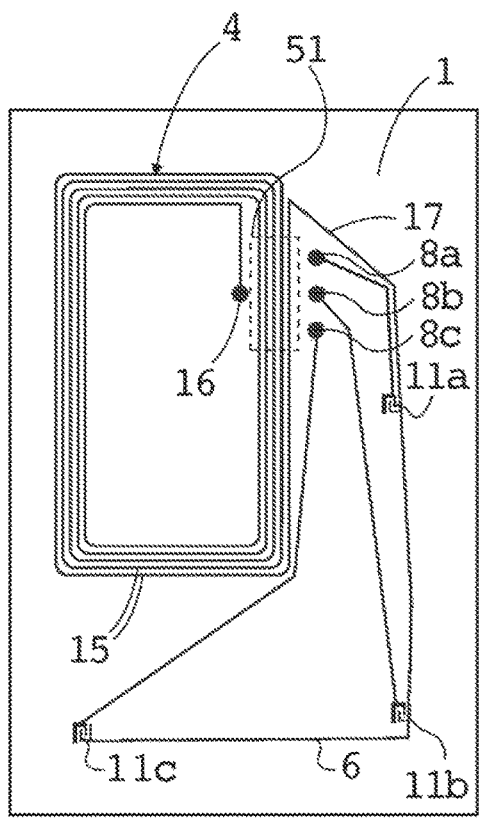
FIGS. 27, 28, 29 and 30 show by way of example an embodiment of a production variant according to the invention.
Figure 28:
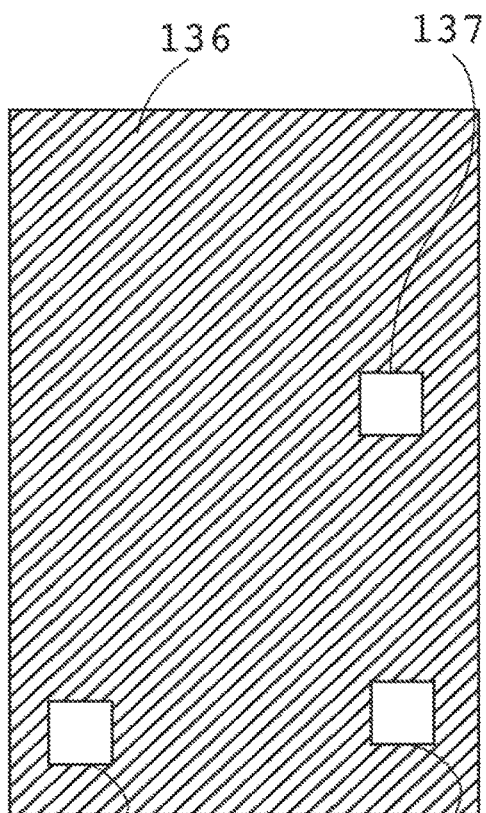

FIG. 26 shows the switch 2 represented in FIG. 25 in the actuated state. When a force is exerted normal to the plane of extent of the substrate 1, 10, the layer of electrically insulating material 132 is deformed or displaced. As a result, at least one contact point 131 is formed, in that the switch element 11 contacts the further switch element 12 in an electrically conducting manner, so that current can flow over the switch 2.

After the end of the exposure to pressure, the layer of electrically insulating material 132, such as for example adhesive, resumes its original form and the switch 2 is not constantly activated. Particularly suitable for the forming of such a switch 2 is a combination of conductive silver lacquer for forming the switch elements 11, 12 and a layer of aluminum as the electrically insulating material 132.

In the case of all of the switches represented, a spacer may optionally be arranged on a substrate 1, 10 in the region around the switch 2, so that, when slight pressure is unintentionally applied to the switch 2, for example during the stacking of devices 100, 100', the switch 2 is not undesirably closed.

In the case of all of the switches 2 represented, there is the possibility that the substrates 1, 10 are adhesively bonded to one another. To avoid unintentional activation of the switches or to prevent complete insulation of the two switch elements 11, 12 from one another because of the adhesive bonding, it may be provided in the region of the switch elements 11, 12 that that region of the substrate 1 and/or of the further substrate 10 in the region of or within a surrounding area 137 of the switch elements 11, 12 is kept free of adhesive. One possible variant, which shows such an area kept free, is represented in FIG. 27 to FIG. 30.

If a switch 2 is formed by a combination of conductive lacquer and other conductible material, an adhesive or lacquer that serves as a spacer, which is for example cured by UV radiation and subsequently no longer deformable, is advantageously used in the industrial production of such a switch. Such a material is also particularly suitable for the forming of spacers for switches, since the volume remains almost the same during the curing.

In particular, it can in this way be ensured that the switch concerned is not constantly conductive or activated and that conductivity is only obtained when the switch is also actually pressed.

This can be achieved in particular in that a conventional adhesive is applied, but a region that is free from any adhesive remains around the locations of the switches. This has the effect that a certain clearance remains between the two switch elements 11, 12. Even after great pressure is applied, the two layers move apart again and the switch is consequently operational and not constantly active.

The substrate 1 and the further substrate 10 are in this case adhesively bonded to one another and that region of the substrate 1 or of the further substrate 10 within a surrounding area 137 (FIG. 28) of the switch elements 11, 12 is kept free of adhesive.

Optionally, there is also the possibility that there is inserted in the region around the switch 2 an additional spacer, which at least partially surrounds the switch 2. Such a spacer is meaningful and advantageous especially whenever, as during the stacking of journals in the course of transport, it is the case that the individual pages are exposed to great pressures. The additional spacer around the switch 2 ensures that the paper layers remain spaced apart in the further switch region.

Particularly advantageous for this are materials that can be applied in a printing process, such as for example adhesive, in particular UV-curing adhesive, or lacquers, in particular relief lacquer. The spacer used may be applied in a grid, so that the conducting materials can only be brought into electrically conducting contact, and a switch 2 triggered, when there is deliberate and specific exposure to pressure. If the pressure subsides, the switch resumes the deactivated state.

The device 100 according to the invention can be implemented with particularly thin paper, for example with two 40-gram paper layers, in that priming is applied to the paper for locations that otherwise remain white, in order that the electronic components and the conductive lacquer do not show through. Moreover, with the technical components in the label 5, 5' and the conductor tracks 6, 7, it is likewise possible to achieve an extremely small layer thickness, which is possibly below 0.1 millimeter.

With this process technology, the device according to the invention proves to be particularly robust and durable. This is achieved by the use of flexible materials and smallest technical elements. The NFC chips 3 that are used can for example be produced with a thickness smaller than 70 micrometers. The bonding of one onto the other joins the two layers to each other in such a way that the function is maintained even if they undergo strong bending, or even slight folding.

Alternatively, in the case of all of the embodiments of a device 100, 100' according to the invention, other known two-dimensional switches may also be used as switches 2, such as preferably also snap disks of high-grade steel. The snap disk is in this case arranged on a substrate 1 with conductor tracks 6, in particular on a label, and serves in this case as a momentary contact switch, which is open in its initial state, so that no electrical current flows over the switch 2. By pressing the snap disk, an electrical contact is established between the snap disk and a conductor track 6, so that a closed circuit is formed. A further substrate 10 may be arranged over the snap disk and cover it, so that it is not visible to a user of a device 100, 100'.

If in the case of one of the embodiments of the invention already represented an electrical circuit is established by actuating a switch 2 according to the invention, an electrical voltage is induced in the NFC antenna 4 in an arrangement comprising a device 100, 100' and also an NFC-enabled data communication device 60, which is in data communication connection with one of the NFC chips 3 by way of the NFC antenna 4.

The NFC chip 3 assigned to the respective switch 2 is supplied with electrical energy from the NFC-enabled data communication device by way of the NFC reader antenna 61 and transmits the items of information stored in it by means of a prescribed protocol to the NFC-enabled data communication device 60. The NFC-enabled data communication device 60 processes the items of information arriving at it and performs the commands contained therein or displays the information contained therein. Thus, for example, a link to an Internet site can be called up by the NFC-enabled data communication device 60 by pressing a switch 2 on the device 100, 100' according to the invention.

Depending on the NFC chip 3 that is used, the rapidity of transmitting commands or the storage capacity or else the possibility of not only transmitting stored commands but also actively storing information on the NFC chip 3 can be ensured in the case of a device 100, 100' according to the invention. The contacts of the NFC chip 3 are for example in this case provided in a contacting manner by a conductive adhesive on the conductor tracks 7.

The commands to be performed and the items of information to be displayed are in this case stored after application to the label, in particular before the label is provided on the substrate 1. Alternatively, information may be stored on the NFC chip 3 after the NFC chip 3 is provided on the device 100 according to the invention. The stored commands may in this case for example open Internet sites on an NFC-enabled data communication device 60 or perform commands in applications stored on the NFC-enabled data communication device 60.

Hereafter, an example for producing a substrate 1, 10 of a device 100 according to the invention is shown in more detail. First, the position of a data communication device 60 with reference to the substrate 1 is established and, depending on it, the position of the NFC antenna 4 with respect to the substrate 1 is determined.

Subsequently, the position of switches 2, 2, . . . , 2c with reference to the substrate 1 is established and control commands to be performed on the NFC-enabled data communication device 60 or links to the individual switches 2, 2a, . . . , 2c are assigned. Furthermore, the position of the label 5, 5' and the conductor tracks 6 with reference to the established positions of the data communication device 60 and the switches 2; 2a, . . . , 2c are established, so that a closed circuit can be produced by applying the label 5, 5'.

Optionally, a printed image and a printing format can be selected for the substrate 1 that is used for producing the device 100, 100' according to the invention. The substrate 1 is in this case printed with the printed image provided for it or the graphic provided for it, preferably on its side opposite from the conductor tracks 6.

After establishing the position of the label 5, 5' and possibly printing the substrate 1, the conductor tracks 6 are applied to the substrate 1. Following that, the switches 2, 2a, . . . , 2c or switch elements 11 are positioned on the substrate 1 or are created on the substrate 1, for example by printing on the side of the substrate 1 that is facing the conductor tracks 6.

The NFC chips 3 assigned to a switch 2, 2a, . . . , 2c are programmed with the control commands or links to be transmitted and subsequently the label 5, 5' is applied to the substrate 1 and the contact points 80, 8a, . . . 8e, 80', 8a', . . . , 8e' on the substrate 1 are contacted with the contact points 90, 9a, . . . 9e, 90', 9a', . . . , 9e' of the label 5, 5'.

Optionally, in a method for producing a device 100, 100' according to the invention, a further substrate 10, which is arranged opposite the substrate 1, may also be provided.

Optionally, a printed image may be selected for the further substrate 10, for the side of the further substrate 10 that is facing away from the substrate 1. In this case, the printing format of the further substrate 10 is established in accordance with the printing format of the substrate 1 and the further substrate 10 is printed with for example text or graphics in accordance with the prescribed printed image.

Figure 30:
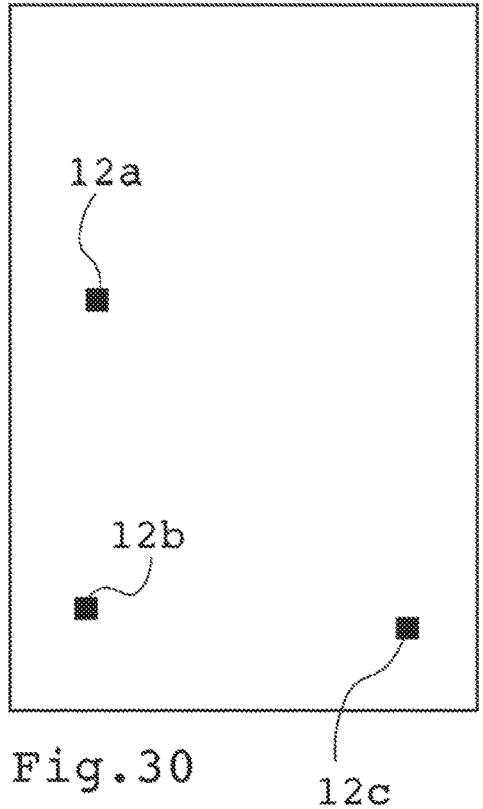
Figure 29:
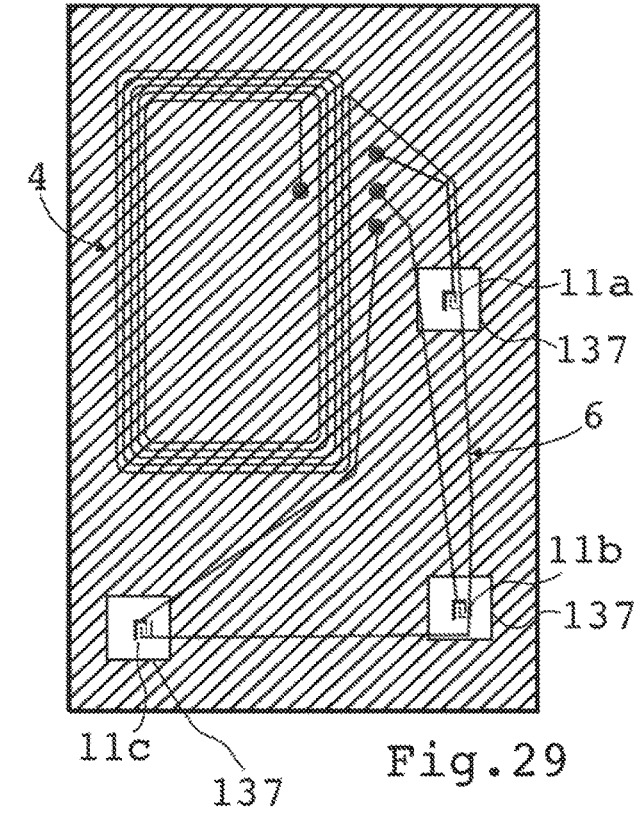

Possibly, further switch elements 12 are formed on the further substrate 10 in the region of the switches 2, 2a, . . . , 2c, on that side of the further substrate 10 that is facing the conductor tracks 6 of the substrate 1 (FIG. 30).

Subsequently, the sides of the substrate 1 and of the further substrate 10 that are respectively facing one another and are provided with the switch elements 11, 12 are joined together, in particular adhesively bonded. The joining together of the substrate 1 and the further substrate 10 makes it possible to produce a device 100, 100' in which the switch elements 11, 12 or the conductor tracks 6 and the label 5, 5' are not visible to a user. Possibly, the device 100, 100' is printed on its sides facing the user, so that the interest of the user for the items of information or links stored on the NFC chips 3 can be effectively aroused.

Furthermore, with a method according to the invention, a substrate 1 that is printed on both sides can be produced. For this purpose, possibly a priming is applied on the side of the substrate 1 on which the conductor tracks 6 are located.

A further printed image is established, in accordance with the printing format of the substrate 1, for that side of the substrate 1 of the device 100, 100' on which the conductor tracks 6 are located. Subsequently, the substrate 1 is overprinted with the selected further printed image on its side facing the conductor tracks 6. Consequently, even when using a single substrate 1, a device 100, 100' that is printed on both sides facing the user can be created. However, for functionality, the switches according to the invention require those supplementary further switch elements 12 that can be formed for example on the further substrate 10 and which would have to be added in the case of such implementations with only one substrate 1. By for example providing further labels 14 at the locations of the switch elements 11, those further switch elements 12, as well as other known two-dimensional switches, can be added here.

A device 100, 100' according to the invention may be used for example in the printing sector for advertisements designed as flyers, brochures or posters or else ads in journals for example. Alternatively, with a device 100, 100' according to the invention, it is also possible for example materials for further education, handouts, product enclosures, packagings or else menus to be designed for a user to be able to use them interactively.

Figure 31:
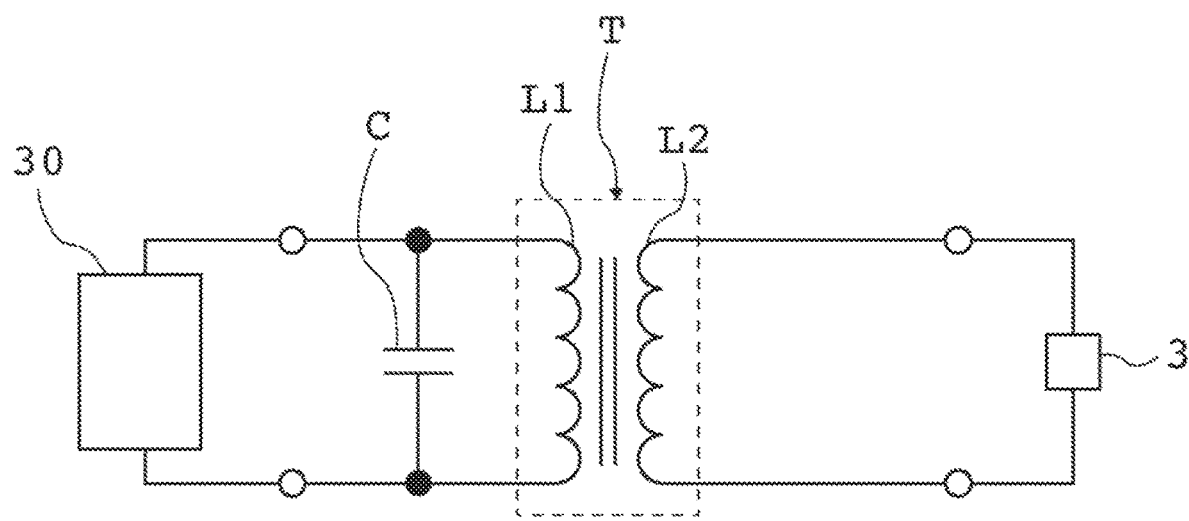
FIG. 31 shows a preferred switching arrangement for writing NFC chips.

The preparation of the individual NFC chips for the printing process may take place in various ways. It is of particular importance for some of the production methods shown here that, for devices 100' according to the invention, the individual NFC chips are a priori, due to their label 5', designed without an NFC antenna 4, and consequently, without an NFC antenna 4 being provided on the label 5', must be written with the respective data records. On the basis of their type of construction, many NFC chips are however set up in such a way that writing or programming of the memory located on the NFC chip is only possible with a connected, constantly active NFC antenna 4. A particularly advantageous method of programming such NFC chips is shown in more detail in FIG. 31.

In order to be able to write the NFC chips 3 of the label 5' flexibly with the associated data records, the switching arrangement represented in FIG. 30 is created. For the programming of an NFC chip 3, the NFC chip 3 concerned is connected by both its connections to one side or coil $L_2$ of a transformer T.

Connected to the other side or coil $L_1$ of the transformer T is a programming unit 30, which is designed to program an NFC chip 3 by using two coils that are coupled to one another. Instead of using two coils, it is envisaged in the present case to provide parallel to the coil $L_2$ of the transformer T a capacitor C which is dimensioned such that the resultant LC circuit applied to the programming unit 30 resonates at 13.56 MHz.

By way of example, one possible way of tuning the transformer T and the capacitor C for achieving the desired resonant frequency of 13.56 MHz may take place as follows: $L_1=L_2=6.888$ µH; C=20 pF.

In the case of previously known NFC applications, the NFC-enabled data communication device 60 is held against the respective active NFC tag 70 or the NFC antenna 4 of that tag 70, as schematically shown in FIG. 2. By contrast to this, in the case of the application represented in FIG. 3 of a device 100, 100' according to the invention, the NFC-enabled data communication device 60 is placed onto the marking 22 of the device 100, 100', in order to allow an interaction with the NFC-enabled data communication device 60 by actuating the switches 2 of the device 100, 100'.

In order to ensure here a satisfactory functionality that is as easy as possible for the user when placing a wide variety of NFC-enabled data communication devices 60 on the marking 22, an NFC antenna 4 of a size and form that are optimally adapted to the NFC reader antennas 61 of commonly used NFC-enabled data communication devices 60 is used in the case of the device 100, 100'.

Since in the case of customary NFC antennas 4 of conventional NFC tags 70, the coil size is kept relatively small, for example in the range of 38×38 mm, it is difficult with the large number of positions that the NFC reader antennas 61 in commonly used NFC-enabled data communication devices 60, in particular NFC-enabled smartphones, assume to establish an NFC data communication with different NFC-enabled data communication devices 60 as long as it is provided that the marking 22 of the respective device 100, 100' onto which the NFC-enabled data communication device 60 is respectively placed is uniform with regard to form and size.

Therefore, advantageously used in the case of the device 100, 100' according to the invention is an NFC antenna 4 of a size and form which, with similar positioning of NFC-enabled data communication devices 60, in particular NFC-enabled smartphones, with respect to the device 100, 100', extensively cover, or at least extensively overlap in a certain region, a greatest possible number of positions of NFC reader antennas 61 in NFC-enabled data communication devices 60, in particular NFC-enabled smartphones, in order when placing a wide variety of NFC-enabled data communication devices 60 on the marking 22 of the device 100, 100' to create a coupling between the electric potential field that emanates from the NFC reader antenna 61 of the NFC-enabled data communication device 60 and the electric potential field of the NFC antenna 4 located on the substrate 1 or the label 5.

FIG. 32 shows a graphic in which the outlines of 37 different commonly used NFC-enabled data communication devices 60, or smartphones, are shown overlapping. These are respectively aligned centrally at the upper edge 63 of the marking 22, since, for reasons of behavioral psychology, when positioning their NFC-enabled data communication device 60 on the device 100, 100', users tend to align it on the device 100, 100' at the upper edge 63 of the marking 22.

As an alternative to this, the NFC-enabled data communication devices 60 may also be aligned at any other kinds of uniformly established locations, as long as it is conducive to achieving the result. Thus, it is possible for example to choose a point on the basis of which the center point of the corresponding NFC-enabled data communication device 60 is respectively aligned.

Marked in each case in the outlines of commonly used NFC-enabled data communication devices 60 is the position of the NFC reader antenna 61 of the respective NFC-enabled data communication device 60 (FIG. 33). Altogether, this wide variety of placements leads to a surface area 62 or overall scheme of positions of NFC reader antennas 61 of the NFC-enabled data communication devices 60, which is marked in FIG. 32.

In the case of the commonly used NFC-enabled data communication devices 60 currently available on the market, the surface area 62 has approximately outer dimensions of 70×140 mm (FIG. 32).

Figure 35:
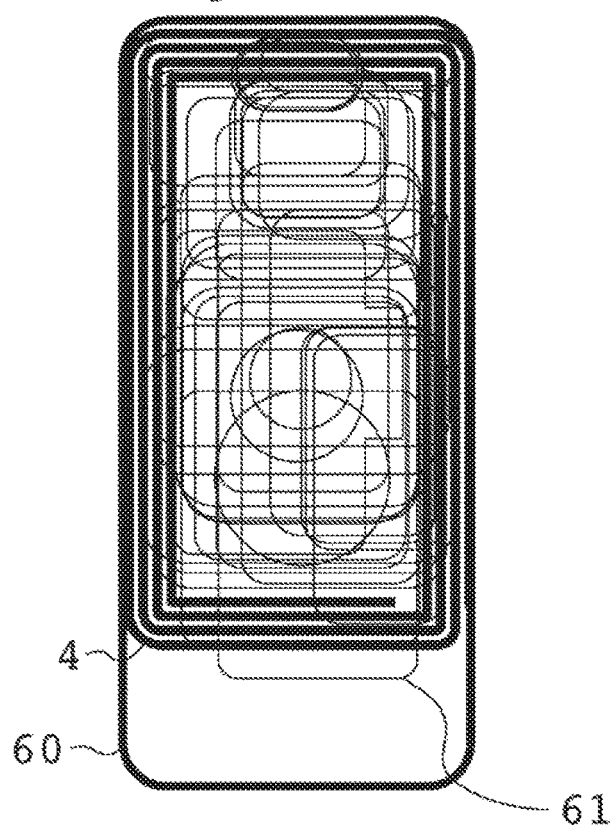
FIGS. 35 and 36 show two overlaying representations of NFC antennas of the device and various NFC reader antennas of present data communication devices.

This approach to creating the NFC antenna design advantageously has the effect that the antenna size and form, such as for example in the case of the NFC antenna 4 represented in FIG. 35, extensively cover a multitude of NFC reader antennas 61 of NFC-enabled data communication devices 60 in an appropriate region, and consequently optimally satisfy the purpose of widest possible functionality.

The main advantage of an NFC antenna 4 designed in such a way is that the user does not have to keep moving his mobile NFC-enabled data communication device 60 around and try out a wide variety of positions to be able to establish an NFC communication, and for example open links, as would be the case with the antenna sizes and forms of conventional NFC tags 70 if they were used in a device 100, 100' according to the invention. Quite on the contrary to this, an easy and direct execution of the desired interaction is made possible, since the probability of a coupling of the NFC reader antenna 61 of the respective mobile data communication device 60 to the NFC antenna 4 of the device 100, 100' is maximized as a result of the highly extensive coverage.

On the basis of the NFC-enabled data communication devices 60 currently available on the market, recommended for the outer dimensions of the NFC antennas 4 are a width of 60 to 80 mm and a height of 110 to 150 mm (FIG. 35). The greater the extent of the NFC antenna 4 is made within the limits indicated, the greater for the user is the tolerance to inaccurate placement of the NFC-enabled data communication device 60 with reference to the marking 22 provided on the device 100, 100'. However, with increasing enlargement or scaling, the signal strength of the NFC antenna 4 becomes increasingly weaker.

FIG. 34 schematically shows an implementation of the device 100, 100' according to the invention with an NFC antenna 4 designed in such a way. The substrate 1 here is a paper of the DIN A4 format of 210×297 mm and the printed NFC antenna 4 has outer dimensions of 74×131 mm. The four windings are each 2.2 mm wide.

In the actual configuration of the NFC antenna 4, easy and wide functionality can be ensured if the parameters are dimensioned as follows: the number of windings proves to be a particularly significant performance feature of the NFC antenna 4. As long as the width of the windings is in a range smaller than 3 mm, four windings are sufficient in order that the overall resistance of the NFC antenna 4 does not significantly exceed twenty-five (25) ohms, as long as the NFC antenna is printed on paper in the screen printing process with commonly used conductive silver lacquers compatible with screen printing and is dried in accordance with the specifications of the conductive silver lacquer that is used. If the number of windings is increased, the receiving range of the NFC antenna 4 is increased in size. The resistance can be reduced by higher and wider application of the antenna material, and also by using a suitable substrate that proves to be conducive to the electrical conductivity.

If paper is used as the substrate material and the NFC antenna 4 is printed with an electrically conducting lacquer, for example with conductive silver lacquer, coated papers with a surface that is as smooth as possible often prove to be particularly suitable. Rough papers, on the other hand, tend to absorb the applied materials more strongly, which has the effect that the conductivity of the conductive lacquer is inhibited by the influence of paper fibers.

When creating NFC antennas 4 according to the invention, a reduction of one of the parameters, layer thickness or line thickness, can be compensated by increasing the other parameter, respectively, so that overall the material consumption remains approximately the same.

Figure 36:
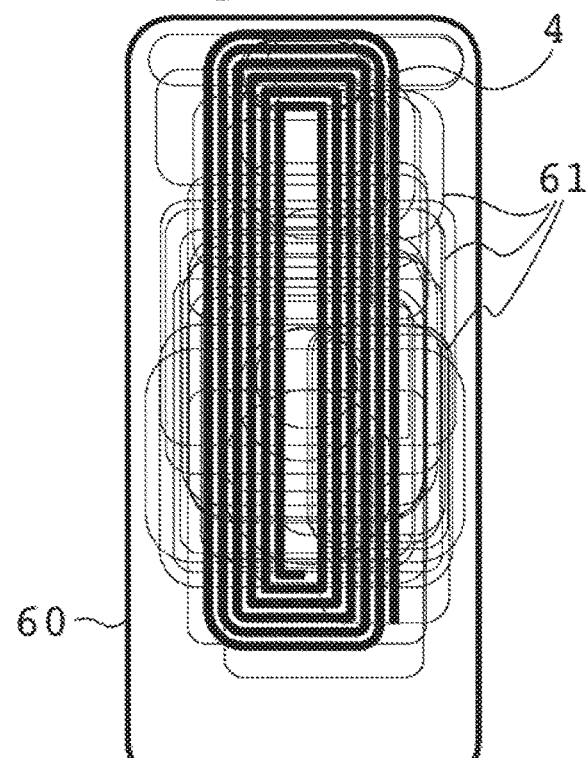

Furthermore, the number of windings likewise plays a role with regard to the reception strength of the NFC antenna 4 in that interrelationship of the parameters. Thus, for example, the width of the NFC antenna 4 of 60 to 80 mm may be reduced to approximately 40 to 45 mm, as long as, depending on the extent of the reduction in width, the NFC antenna 4 is supplemented by a fifth or sixth winding inwardly, in order to compensate for the reduction in size with a stronger frequency of the NFC antenna 4 (FIG. 36). In this case (FIG. 36), when there are a large number of NFC-enabled data communication devices 60, the NFC reader antennas 61 of the NFC-enabled data communication devices 60 are no longer covered over their full extent, but only extensively overlapped, which, as a result of the added windings, is likewise sufficient for building up an NFC communication with present NFC-enabled data communication devices 60.

The invention claimed is:

1. A device, comprising:
a substrate;
a plurality of switches disposed on said substrate and interrupted in an initial state;
a plurality of near-field communication (NFC) chips each respectively assigned to at least one of said switches;
a NFC antenna;
said switches and said NFC chips assigned to said switches being connected to one another in series resulting in individual series circuits being created, respectively each containing one of said switches and an NFC chip of said NFC chips assigned to said one switch, and being connected in each case to said NFC antenna;
a label having a film-shaped main body, said label joined face to face with said substrate;
said NFC chips are disposed on said label;
said switches are disposed on said substrate in a region different from a region joined by said label;
conductor tracks electrically connecting said switches, said NFC chips and said NFC antenna disposed on said substrate and said label; and
mutually facing contact points, which establish an electrically conducting contact between said conductor tracks on said label and on said substrate, are disposed on said label and on said substrate.

2. The device according to claim 1, wherein said conductor tracks on said label and/or on said substrate are electrically conductive layers.

3. The device according to claim 1, wherein said mutually facing contact points are electrically conductive layers, said electrically conductive layer and/or said mutually facing contact points being formed as superficially conducting.

4. The device according to claim 1, wherein said NFC antenna is disposed on said label.

5. The device according to claim 1, further comprising a further substrate, said label being disposed between said substrate and said further substrate.

6. The device according to claim 5, wherein at least one of said switches is formed by two switch elements lying opposite one another on said substrate and said further substrate and disposed facing one another, at least one of said two switch elements having, facing another of said switch elements, an insulating surface layer disposed between said two switch elements and electrically insulates them from one another in the initial state.

7. The device according to claim 6, wherein:
said switch elements running on said substrate have two connections interrupted by an interruption, which are electrically insulated from one another in the initial state; and
further switch elements of said switch elements disposed on a region of said further substrate that is opposite said switch elements running on said substrate are configured to come into electrically conducting contact with each of said two connections of a respectively associated one of said switch elements running on said substrate when exposed to force in such a way as to bridge said interruption and connect said two connections of a respectively associated switch element of said switch elements electrically separated from one another by said interruption in an electrically conducting manner.

8. The device according to claim 6, wherein:
at least one of said switch elements is formed by a layer of a conducting material with a superficially insulating coating; and
said substrate and said further substrate are adhesively bonded to one another, and that a region of said substrate and/or of said further substrate in a region of said switch elements is kept free of an adhesive connecting said substrate and said further substrate to one another.

9. The device according to claim 1, further comprising further labels and said switches are respectively disposed separately on said further labels, said further labels being disposed on said substrate.

10. The device according to claim 1, wherein:

said NFC antenna and said NFC chips are disposed on said label;

said NFC antenna is formed on said label and has a plurality of windings, an inner connection, an outer connection, and a bridging, said bridging is connected in an electrically conducting manner to said inner connection, said bridging being led in an insulated manner from said windings into a region outside said NFC antenna;

said NFC chips each having terminals and in each case one of said terminals of each of said NFC chips disposed on said label is connected in an electrically conducting manner respectively to a contact point of said mutually facing contact points;

another one of said terminals respectively of each of said NFC chips disposed on said label is connected in an electrically conducting manner by way of said bridging to said inner connection of said NFC antenna;

said outer connection of said NFC antenna is connected in an electrically conducting manner to a further contact point of said mutually facing contact points disposed on said label; and each of said contact points is connected in an electrically conducting manner by way of said conductor tracks running on said substrate to said outer connection by way of said further contact point, a switch of said switches that is interrupted in the initial state being respectively disposed in each of said conductor tracks.

11. The device according to claim 1, wherein:

said NFC antenna is formed on said substrate and has a plurality of windings, an inner connection, and an outer connection, and individual one of said windings of said NFC antenna running in at least one bridging region such that they are spaced apart next to one another;

said label is disposed extending over said bridging region and has a contact point of said mutually facing contact points, which is in electrically conducting contact with said inner connection of said NFC antenna;

said NFC chips having connection terminals and in each case a connection terminal of said connection terminals of said NFC chips disposed on said label is connected in an electrically conducting manner to said contact point;

another connection terminal of said connection terminals respectively of each of said NFC chips disposed on said label is in conducting contact by in each case a further contact point of said mutually facing contact points in a region of said substrate that is located outside said NFC antenna; and said further contact points are connected in an electrically conducting manner by way of in each case one of said conductor tracks running on said substrate to said outer connection of said NFC antenna, a switch of said switches that is interrupted in the initial state being respectively disposed in each of said conductor tracks.

12. The device according to claim 1, wherein said NFC antenna has:

outer dimensions with a width of 40 to 80 mm and a height of 110 to 150 mm; and/or a number of 3 to 7 windings with a line thickness of in each case less than 3 mm and a layer thickness of less than or equal to 40 µm; and/or an overall resistance of less than or equal to 25 ohms.

13. A configuration, comprising:

a device according to claim 1; and a near-field communications enabled data communication device, which by actuating one of said switches is in data communication connection with one of said NFC chips by way of said NFC antenna.

* * * * *